United States Patent
Dolník et al.

(10) Patent No.: US 12,444,022 B2
(45) Date of Patent: Oct. 14, 2025

(54) FOCUS STACKING APPLICATIONS FOR SAMPLE PREPARATION

(71) Applicant: FEI Company, Hillsboro, OR (US)

(72) Inventors: Matej Dolník, Brno (CZ); Radim Kříž, Slapanice (CZ); Lukáš Malý, Brno (CZ)

(73) Assignee: FEI Company, Hillsboro, OR (US)

( * ) Notice: Subject to any disclaimer, the term of this patent is extended or adjusted under 35 U.S.C. 154(b) by 178 days.

(21) Appl. No.: 18/217,129

(22) Filed: Jun. 30, 2023

(65) Prior Publication Data
US 2025/0005714 A1    Jan. 2, 2025

(51) Int. Cl.
| | |
|---|---|
| *G06T 5/50* | (2006.01) |
| *G01N 1/28* | (2006.01) |
| *G06T 7/55* | (2017.01) |
| *G06T 7/73* | (2017.01) |
| *H01J 37/08* | (2006.01) |
| *H01J 37/22* | (2006.01) |
| *H01J 37/304* | (2006.01) |
| *H01J 37/305* | (2006.01) |

(52) U.S. Cl.
CPC .............. *G06T 5/50* (2013.01); *G01N 1/2813* (2013.01); *G06T 7/55* (2017.01); *G06T 7/73* (2017.01); *H01J 37/08* (2013.01); *H01J 37/222* (2013.01); *H01J 37/3045* (2013.01); *H01J 37/305* (2013.01); *G06T 2207/10061* (2013.01); *G06T 2207/10064* (2013.01); *G06T 2207/20212* (2013.01); *H01J 2237/31745* (2013.01); *H01J 2237/31749* (2013.01)

(58) Field of Classification Search
CPC .... G06T 5/50; G06T 7/55; G06T 7/73; G01N 1/2813; H01J 37/08; H01J 37/222; H01J 37/3045; H01J 37/305
USPC ............................................................ 348/80
See application file for complete search history.

(56) References Cited

U.S. PATENT DOCUMENTS

| | | | |
|---|---|---|---|
| 2012/0074317 A1* | 3/2012 | Diemer | H01J 37/28 250/307 |
| 2012/0236120 A1* | 9/2012 | Kramer | G02B 21/0004 382/128 |

(Continued)

OTHER PUBLICATIONS

Burt et al., "Enhanced Image Capture Through Fusion," *1993 (4th) International Conference on Computer Vision*, pp. 173-182 (May 1993).

(Continued)

*Primary Examiner* — Matthew David Kim
(74) *Attorney, Agent, or Firm* — Klarquist Sparkman, LLP

(57) ABSTRACT

Methods and apparatus apply focus stacking to sample preparation, improving accuracy of analytic tasks, facilitating automation, and improving throughput. Focus stacking is applied to a set of sample images having different focus depths, to produce a composite image in which features at different depths are in focus and, optionally, a depth map. A sample location is selected from the composite image and a localized material removal, measurement, or imaging operation is performed based on the sample location. A depth value from the depth map is used to set a working depth of a tool for performing the localized operation. Applications include lamella preparation for cryogenic TEM analysis of biological samples. Other applications, techniques, and variations are disclosed.

21 Claims, 13 Drawing Sheets

(56) References Cited

U.S. PATENT DOCUMENTS

| | | | | |
|---|---|---|---|---|
| 2012/0237137 | A1* | 9/2012 | Chen | G06T 5/50 |
| | | | | 382/284 |
| 2013/0205808 | A1* | 8/2013 | Mulders | G01N 1/42 |
| | | | | 62/62 |
| 2014/0007307 | A1* | 1/2014 | Routh, Jr. | H01J 37/26 |
| | | | | 850/3 |
| 2014/0022352 | A1* | 1/2014 | Fisker | G06T 5/50 |
| | | | | 348/46 |
| 2014/0070113 | A1* | 3/2014 | Straw | H01J 37/226 |
| | | | | 250/492.3 |
| 2015/0357159 | A1* | 12/2015 | Stone | H01J 37/317 |
| | | | | 204/298.36 |
| 2016/0041095 | A1* | 2/2016 | Rothberg | G01N 21/648 |
| | | | | 506/4 |
| 2016/0084761 | A1* | 3/2016 | Rothberg | C12Q 1/6869 |
| | | | | 506/4 |
| 2017/0061601 | A1* | 3/2017 | Bryll | G06T 5/50 |
| 2017/0212355 | A1* | 7/2017 | Chryssis | G02B 19/0057 |
| 2018/0114671 | A1* | 4/2018 | Mitchels | H01J 37/185 |
| 2018/0218878 | A1* | 8/2018 | Xu | H01J 37/28 |
| 2020/0092468 | A1* | 3/2020 | Mermelstein | H04N 23/62 |
| 2020/0402813 | A1* | 12/2020 | Clarke | G11C 5/025 |
| 2021/0158496 | A1* | 5/2021 | Bouchard | H04N 23/676 |
| 2022/0101511 | A1* | 3/2022 | Emtman | G01B 11/005 |
| 2022/0392793 | A1* | 12/2022 | Buxbaum | G06T 7/50 |
| 2023/0153960 | A1* | 5/2023 | Garg | G06T 5/50 |
| | | | | 382/255 |
| 2023/0298855 | A1* | 9/2023 | Effting | G01N 1/286 |
| | | | | 250/307 |
| 2024/0280357 | A1* | 8/2024 | Boltje | G01B 11/0675 |
| 2024/0288370 | A1* | 8/2024 | Ji | G01N 21/6458 |
| 2024/0331179 | A1* | 10/2024 | Klochkov | G01N 23/203 |

OTHER PUBLICATIONS

Denkowski et al., "Estimating 3D Surface Depth Based on Depth-of-Field Image Fusion," available from https://www.researchgate.net/publication/221910067_Estimating_3D_Surface_Depth_Based_on_Depth-of-Field_Image_Fusion, pp. 89-104 (Jan. 2011).

Hovden et al., "Extended Depth of Field for High Resolution Scanning Transmission Electron Microscopy," ArXiv:1010.4500, pp. 1-20 (Oct. 2010).

Mzaik et al., "Multiresolution from Architectures and Algorithms" (thesis), available from https://etd.ohiolink.edu/apexprod/rws_etd/send_file/send?accession=osu1487849696966974&disposition=inline, pp. 1-180 (1994).

Toet, "Image fusion by a ratio of low pass pyramid," *Pattern Recognition Letters*, vol. 9, No. 4, pp. 245-253 (May 1989).

Wang et al. "A Multi-focus Image Fusion Method Based on Laplacian Pyramid," *Journal of Computers*, vol. 6, No. 12, pp. 2559-2566 (Dec. 2011).

Wikipedia, "Focus Stacking," downloaded from https://en.wikipedia.org/wiki/Focus_stacking on Jun. 29, 2023, pp. 1-7.

European Search Report dated Oct. 17, 2024, from European Patent Application No. EP24185030, 3 pages.

Phaneuf, "Applications of focused ion beam microscopy to materials science specimens," *Micron*, vol. 30, No. 3, pp. 277-288 (Jun. 1, 1999).

Smeets et al., "Integrated Cryo-Correlative Microscopy for Targeted Structural Investigations in Situ," *Microscopy Today*, vol. 29, No. 6, pp. 20-25 (Nov. 1, 2021).

Wu et al., "Multi-scale 3D Cryo-Correlative Microscopy for Vitrified Cells," *Structure*, vol. 28, No. 11, pp. 1231-1237 (Aug. 18, 2020).

* cited by examiner

FOCUS STACKING APPLICATIONS FOR SAMPLE PREPARATION

BACKGROUND

Transmission electron microscopy (TEM) requires a thin sample (commonly 10-150 nm thick) known as a lamella. Lamella preparation can involve imaging, e.g. to find a feature to be analyzed by TEM, and milling to prepare a lamella incorporating that feature. An imaging based workflow can also be employed in other sample preparation applications.

Some tools, such as focused ion beam (FIB) or fluorescence microscopes, can have depth of focus less than a depth variation of an imaged sample region, which can pose a challenge using these tools for the imaging. In some workflows, this issue can be circumvented by performing surface imaging using a scanning electron microscope (SEM), with a large depth of focus, and a feature identified in the SEM image can be used to guide subsequent FIB milling. However, correlating an SEM view of a surface with a FIB view of the same surface can be difficult and error-prone, particularly for surfaces having significant topographic variations ("bumpy surfaces") when view axes for the SEM and FIB are different.

In other workflows, fluorescence imaging can be used to locate features in the interior of a sample, and cannot be replaced with SEM imaging. Using fluorescence images to guide lamella preparation can require sifting through a series of fluorescence images, taken at different focus depths, to identify a feature for TEM imaging. This can be a tedious process, made more so by being unable to readily visualize related features at different depths.

Accordingly, there remains a need for improved technologies for imaging as a guide to sample preparation, in a range of applications not limited to manufacture of TEM lamellae.

SUMMARY

In brief, examples of the disclosed technologies use focus stacking to consolidate and present sample features at different depths all in focus in a single composite image. A sample location can be selected from the composite image, either interactively by a user or by automated software. A localized operation can be performed on the sample based on the selected location.

In some examples, focus stacking can also generate a depth map which can directly indicate a depth value of the selected location or at another location having a predetermined spatial relationship to the selected location. The combination of transverse coordinates of a composite image pixel and depth value from the depth map can accurately specify a three-dimensional position of a given feature. The working depth of a tool can be set accordingly, for accurately performing the localized operation.

In particular, the disclosed technologies can be applied in environments having topographic variations on a sample surface, a grazing incidence beam for imaging or milling, or a beam with restricted depth of focus (e.g. comparable to or smaller than a sample size). The disclosed technologies can address challenges of achieving nanometer accuracy when working with samples and tools having micron scale variations. In one application, the disclosed technologies can be applied to milling a TEM lamella from a sample, increasing throughput for a variety of reasons described further herein. However, the disclosed technologies are broadly applicable to improve workflow automation or to improve accuracy or yield of imaging-based analysis operations. Such operations can include material removal, measurement, or further imaging.

The foregoing and other objects, features, and advantages of the invention will become more apparent from the following detailed description, which proceeds with reference to the accompanying figures.

DETAILED DESCRIPTION

Introduction

Figure 1:
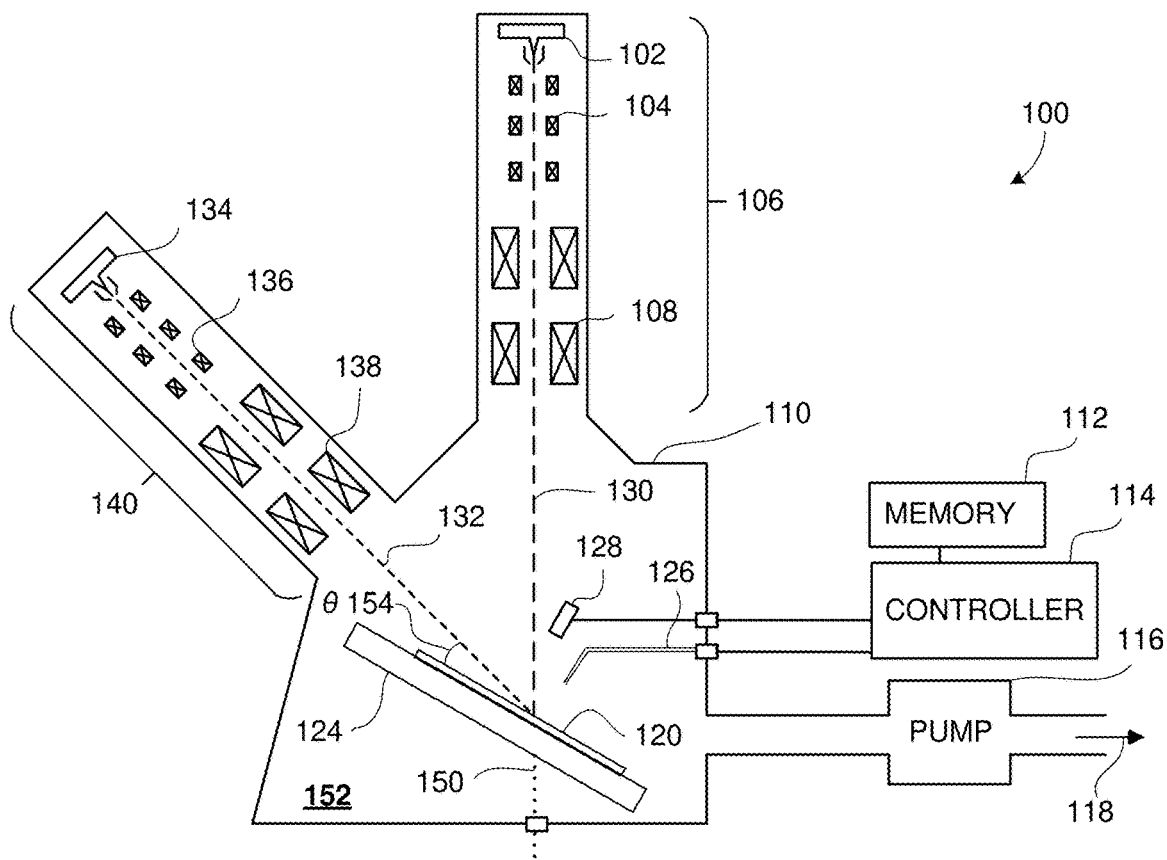
FIG. 1 is a diagram of an example apparatus with which the disclosed technologies can be implemented.

Transmission electron microscopes (TEM) are increasingly used for analysis of biological samples, as well as material science samples and semiconductor devices. Cryo-electron microscopy in particular enables structure determination without a crystal structure.

Throughput can be a key consideration in many applications. Often, multiple sample sites can be prepared on a single substrate. Sample sites can be prepared as thin lamellae using a FIB tool, for example. Placing the substrate at an oblique angle can bring more sample sites within a restricted field of view of a FIB column. To illustrate, orienting the substrate surface at a grazing angle of 10° relative to the FIB beam axis (i.e. angle of incidence 80°) can increase sample area within a FIB field of view by about $1/\sin(10°)=5.75$, as compared to normal incidence. A grazing incidence FIB offers another advantage in that sample material above and below the lamella can be milled away, allowing the lamella to be used as attached to the original substrate, without e.g. detachment and reattachment onto a separate lamella holder.

Therefore, it can be desirable to identify features and sample sites as seen along a FIB beam axis. A FIB tool used for milling (e.g. at high beam current) can also be used for imaging (e.g. at low beam current). However, depth of focus of a FIB beam can be limited to about 20-50 µm, which can be less than the dimensions of a single 100 µm sample site, let alone a typical 3 mm diameter grid plate.

To avoid issues with depth of focus, some workflows use normal incidence SEM imaging of the sample. While surface features can be readily identified from the SEM image, correlating a feature position from the SEM image to the FIB perspective can be challenging, for reasons including geometric corrections for topographic variations (e.g. "bumpy surface"), contrast or edge diffraction variations between SEM and FIB, and time dependent fluctuations in beam steering. The time taken for image correlation, between SEM and FIB, and a propensity for error can directly degrade the achievable throughput.

The disclosed technologies apply focus stacking to permit FIB images, even at grazing incidence, to be used directly for feature identification. Thus, the same tool can be used for imaging and subsequent milling to prepare a lamella. Imaging can also be performed in between milling operations to track and compensate for beam drift. Moreover, focus stacking can provide a depth map as an auxiliary output, so that the working depth at or near an identified feature can be accurately known, and FIB milling can be set accordingly. Because variations in beam focus depth are related to variations in beam spot size, accurate control of a FIB mill can directly provide tight tolerance of the resulting lamella thickness, which can be a critical dimension in TEM applications.

In other applications, features can be identified within the interior volume of a sample, e.g. by fluorescence imaging of a fluorophore attached to a protein or other biomolecule. Like FIB, fluorescence microscopy can also have a limited depth of focus, and complete imaging of a sample volume can require a stack of 10-100 fluorescence images at different focus depths. Some workflows allow manual scanning among these images, e.g. using a slider on an interactive display to select or vary an image slice, but are unable to simultaneously show features at different depths.

The disclosed technologies apply focus stacking to produce a composite image including focused features from a wide range of depths. The ability to simultaneously visualize features at different depths can provide an informed assessment of features in relation to their environment, or in relation to a larger object of which they are a part. Particularly, transverse distances in a composite image, or depth values in a companion depth map, can provide clues regarding orientation of the larger object or the features. With this information, a user or an automated program can make an informed selection of those features which are favorably oriented for TEM imaging or lamella preparation. Furthermore, orientation information can guide selection of lamella orientation, so that a selected feature has a desirable orientation for TEM analysis within the lamella. In turn, the selected lamella orientation can guide placement of milling patterns for forming the lamella. Three-dimensional feature and lamella placement information can be transformed from fluorescence beam coordinates (or, sample coordinates) to FIB coordinates for milling, using trigonometry or matrix operations.

Focus stacking and depth map generation can be performed by automated software, and can be readily integrated with preceding steps (e.g. image acquisition) and following steps (e.g. feature selection or pattern milling) in an automated or semi-automated workflow. Focus stacking and depth map generation are quick procedures, typically taking 1-10 ms or 10-100 ms on a workstation or equipment controller, depending on the number and size of individual images.

Terminology

The usage and meaning of all quoted terms in this section applies throughout this disclosure unless clearly indicated otherwise or repugnant to the context. The terminology below extends to related word forms. For convenience, the terms in this section are organized within sub-sections (A) General, (B) Geometry, (C) Imaging, (D) Samples, and (E) Tools and Techniques for Sample Analysis.

A. General

A "controller" is an electronic device coupled to one or more actuators to effect a change in a physical parameter, or coupled to one or more sensors to monitor a physical parameter. Some controllers can include a microprocessor which can be programmed to execute machine readable instructions. The descriptions herein of computing devices are generally applicable to such controllers. Such controllers can include additional electronic circuitry such as filters and amplifiers. Other controllers can include analog circuitry such as filters and amplifiers without any microprocessors.

A "parameter" is a quantity that can have a particular "value". While parameters often have numerical values, this is not a requirement, and some parameter values can be logical values, strings, or data structures. Some parameters can be control parameters, e.g. set by a controller to affect a physical device or physical operation. Other parameters can be sensed parameters, e.g. determined by a physical environment and measured or evaluated (e.g. to form an image or from an image) by a controller or measuring apparatus.

"Software" refers to computer-executable programs, instructions, or associated data structures. Software can be in active or quiescent states. In an active state, software can be loaded into memory, or can be undergoing execution by one or more processors. In a quiescent state, software can be stored on computer-readable media, awaiting transmission or execution. An "instruction" (or "program instruction") encodes an operation (sometimes, together with one or more operands, operand addresses, or destination addresses) to be performed by a processor. A group of instructions can be organized to perform a function. "Interactive software" refers to software programs that present information to a user and receive commands from the user in response to the presented information. "Automated software" refers to software programs that receive information from equipment or from other software programs, and select one or more actions to be performed by equipment or other software programs, without user input.

A "user" is a person. Exemplary users can control analytic procedures or equipment, or can receive a presentation of data or a notification from such analytic equipment. Users can interact with equipment, samples, or software with the help of communication networks, computer input or output interfaces, or client software.

B. Geometry

"Depth" refers to a coordinate in a direction along a beam, with values of depth increasing away from the beam's source. Thus, in a multi-beam system, e.g. with an electron microscope viewing a sample from directly above and a FIB oriented at about 50° from the electron beam, each beam will have its own depth coordinates. A "working depth" is a depth at or near which the beam is expected to interact with the sample. Some tools have beam controls for setting working depth, which can correspond to a depth at which the beam is focused or has a smallest cross-sectional area, e.g. a "beam waist." A "focus depth" is a depth at which a beam has optimum focus, which can be a depth at which transverse extent of the beam is minimum, and can often be the working depth. A "depth of focus" is a size of a range over which the beam is focused according to a predetermined criterion. To illustrate, a depth of focus of 30 µm at a focus depth of 100 µm can be understood as a beam having acceptable focus from 85 µm to 115 µm.

"Height" refers to a coordinate in a direction along a normal from a major surface of a sample. Samples can often be mounted with a major surface in contact with a stage, with height value increasing from the contact surface through the sample, toward and beyond another major surface.

"Height variation" refers to the difference between maximum height and minimum height of a feature, structure, or surface of a sample. The height variation can be over the entire sample, over an entire surface of the sample, over an entire structure or feature present in or on the sample, over an imaged region of the sample, or over some other defined region of interest. Some samples of interest herein can have a surface height variation in a range 1-2, 2-5, 5-10, or 10-20 µm over a surface transverse extent of 2, 5, 10, 20, 50, or 100 µm.

A "major surface" of a sample is a surface of the sample whose area is not substantially exceeded by any other surface of the sample. For convenience of description, samples are considered to have top and bottom major surfaces, with the bottom surface supported on a stage and the top surface exposed to one or more tools or beams. In examples, a beam can also be incident on the sample from below. Desirably, a major surface need not follow detailed topographic variations of a sample surface, but can be an analogous surface-such as a smoothed surface derived from an actual surface, a surface of a substrate of the sample, a back surface of the sample, or a surface of a stage in contact with the sample, any of which can be free of topographic variation.

A "region" is a contiguous two-dimension portion of a sample surface, or a contiguous three-dimensional portion of the sample volume.

A "region of interest" (ROI) is a portion of a sample that includes a feature or structure that is the subject of subsequent analysis. An ROI can be defined with respect to a surface of the sample (e.g. a region of an imaged surface containing a particular feature, or a region in which patterns can be milled to form a lamella containing such feature) or with respect to a volume (e.g. a volume containing a structure to be analyzed further). The term ROI does not refer to any human interest.

A "surface normal" is an outward-facing normal to a surface of a sample. A surface normal can be applied to a major surface of the sample, but this is not a requirement, and a surface normal can also be present at a cut face or topographic feature of the sample.

The term "transverse" can be used relative to a sample or a beam. In the former case, transverse refers to a direction within or parallel to a major surface of an object. In the latter case, transverse refers to directions within a plane perpendicular to a direction of beam propagation. Where not clear from the context, the term can be appropriately qualified to indicate whether a sample or beam is being referred to. For example, a "surface transverse extent" is an extent along a surface of a sample, and a "transverse extent of an image" is an extent in an image plane.

The terms "top," "bottom," "up," "down," "above," "below," "horizontal," "vertical," and the like are used for convenience, with respect to a common configuration in which an exposed major surface of a horizontal sample has an outward normal directed upward, e.g. the sample is accessible to process tools from above. An axis of a process tool (e.g. view axis of an imaging tool or a beam axis of a FIB mill) can be approximately normal downward onto the surface, or can be tilted at an angle (sometimes in a range) 40°-60° relative to the normal. One of ordinary skill will understand from this disclosure that a choice of actual orientation can be varied without departing from the scope of the disclosed technologies.

C. Imaging

The term "imaging" refers to a process for obtaining a two-dimensional representation (dubbed an "image") of a parameter value over a region of interest of a sample. In some examples, the imaged parameter can be backscatter or secondary emission from an incident particle beam (e.g. by SEM or low-current focused ion beam), but this is not a requirement, and visible light or other parameters can also be imaged. In disclosed examples, the image can indicate objects on or in the sample (e.g. cells, proteins, fluorophores, nanostructures, or fiducials) or features (e.g. edges) of such objects.

A "composite image" is an image formed by combining information from multiple input images, e.g. by focus stacking. A composite image can provide more information than any one of the input images, or can provide less misinformation than the input images.

A "depth map" is a data structure, image, or software function which indicates a depth value as a function of transverse position of an imaging beam. A depth map can provide a depth value for each position (e.g. each pixel) of an in-focus zone of a composite image obtained by focus stacking. Depth values of a depth map can be transformed into height values of corresponding positions on an imaged surface of a sample, e.g. using trigonometry, and the resulting height values can be organized as a data structure, image, or software function providing a "height map" of the height values as a function of transverse position on or within the sample.

"Focus stacking" refers to an image processing technique for combining individual images of a sample to obtain a composite image. Each individual image can have a respective focus depth and a respective zone of the image which is in focus. The composite image can have an in-focus zone larger than that of any of the individual images. Some focus stacking techniques can also generate a depth map. Focus stacking can be performed using a multi-scale transform, such as a Laplacian pyramid technique. Focus stacking is a form of image fusion. The term "focus stacking" can also be used as a verb, for performing such a technique.

An "image pyramid" is a sequence of images obtained by multiple iterations of blurring (e.g. low-pass filtering) and downsampling. At each iteration, if the low-pass image is stored, the pyramid can be termed a "Gaussian pyramid". If, at all except the final iteration, the high-pass complement to the low-pass image is stored, then the pyramid can be termed a "Laplacian pyramid." The Laplacian pyramid can be preferred for applications such as focus stacking for reasons including greater compressibility than a Gaussian pyramid, and directly providing information present at each level of the pyramid (e.g. each successive length scale).

An "imager" (sometimes, "imaging tool") is an apparatus capable of imaging. In disclosed examples, an SEM or a FIB can be used as an imager. Some imagers can use response (e.g. secondary emission, backscatter, or fluorescence) to an incident beam as a measured parameter from which an image is formed. An imager using an incident electron beam or ion beam can be termed an "electron microscope" (e.g. SEM) or "ion microscope" (e.g. FIB) respectively. An imager in which the measured parameter includes intensity, wavelength, or another property of light can be termed an "optical microscope." Some optical microscopes use an incident optical beam (e.g. for fluorescence) but this is not a requirement, and other beams, or diffuse or ambient illumination can also be used. Various detectors can be used to measure particle or radiation emanated from the imaged sample, including secondary electron detectors, secondary ion detectors, photodetectors, or spectrometers.

A "multi-scale transform" of a multi-dimensional dataset is a decomposition of the dataset according to scale length (extent) of features represented in the dataset. For example, less pixels with coarse granularity can be sufficient to represent coarse scale features, while more pixels with fine granularity can be required for fine scale features. Multi-scale decomposition can allow features at different scales to be processed efficiently. Examples of multi-scale transforms include wavelet transform, Fourier transform, and various pyramid decompositions.

A "viewing axis" of an image is a direction from which a sample is viewed in the image. For imaging using a beam incident upon a sample, the viewing axis is an axis of the incident beam.

A "zone" is a contiguous portion of an image.

D. Samples

A "sample" is a physical object upon which imaging, milling, or other analytic or manufacturing procedures are performed. Common samples can incorporate biological samples, multi-layer electrical or electronic structures, or other material structures. Biological samples can include cells, proteins, DNA, RNA, viruses, or fragments thereof. Electrical or electronic samples can include semiconductor devices such as logic gates, memory cells, optoelectronic devices, passive components (including interconnect), transistors, and can be in various stages of manufacture or disassembly. Material samples can include microelectromechanical systems (MEMS) or nanostructures. Disclosed techniques can be applied during sample preparation, characterization of the sample, or during manufacture. For example, disclosed technologies can be applied to a sample to form one or more additional samples, e.g. in the form of lamellae for TEM analysis. Some biological samples can be stabilized at cryogenic temperatures (variously, below 120 K, below 80 K, below 20 K, or below 10 K) e.g. by plunge freezing. A sample can include a "substrate" upon which cells, structures, or devices are deposited or fabricated prior to lamella preparation or other analysis.

A "cut face" is a surface of a sample exposed by etching.

A "feature" is a structure or other variation in material composition of a sample that is discernible in an image of the sample. Exemplary features in a biological sample can include cells, binding sites (e.g. a Covid virus spike), mitochondria or other organelles, or fluorophores or other labels applied to biomolecules. Exemplary features in a semiconductor device sample can include components of a memory cell, a transistor, or a metallization pattern. Other features can include reference structures built into the sample.

A "lamella" is a thin sample imaged or intended for imagining in a transmission electron microscope (TEM). A lamella can have thickness in a range of 10-20 nm, 20-30 nm, 8-50 nm, or 5-200 nm.

A "nanostructure" is a structure having extent between 1 nm and 1 μm in at least two orthogonal directions.

A "reference structure" (sometimes termed "fiducial") is a structure manufactured into a sample for use in determining a location of another structure or device in the sample. A reference structure can be visible in an image of the structure and can be used as a reference for positioning a subsequent operation, or for measuring coordinates, distances, or angles in the image.

A "semiconductor device" is a device incorporating one or more semiconductor regions (e.g. doped or undoped silicon, germanium, III-V semiconductors, or similar materials) configured to perform one or more electronic functions. A semiconductor device can be a finished product, a portion thereof, or a product at an intermediate stage of manufacture. Semiconductor devices commonly include other materials to provide insulation or conducting paths between semiconductor regions. Non-limiting examples of semiconductor devices include transistors, memory cells, and some optoelectronic devices. Memory interface circuits can include both conductive wiring and logic gates.

E. Tools and Techniques for Sample Analysis

"Analysis" refers to operations used for characterizing a sample, and can include material removal, other sample preparation, imaging, probe measurements, non-contact measurements, or secondary evaluation of data obtained by any of these techniques. Analysis operations can include imaging (e.g. FIB, optical, or electron microscopy), etching (e.g. ion milling), delayering, electron backscatter analysis, electron microscopy, mass spectrometry, material analysis, metrology, nanoprobing, spectroscopy, or surface preparation. Equipment or instrumentation for performing such operations is referred to as an "analytic instrument", "analyzer", or "tool". Non-limiting examples of tools which can be used in conjunction with the disclosed technologies include mills, etchers, electron microscopes, electron spectrometers, optical microscopes, or optical spectrometers. Particularly, some tools of interest herein incorporate a plasma focused ion beam (PFIB), scanning electron microscope (SEM), or fluorescence microscope.

A "beam" is a directional flow of particles or energy. Common beams of interest in this disclosure are particle beams, such as electron beams or ion beams (including plasma focused ion beams); or an optical beam, such as a laser beam for fluorescence excitation. A beam can have finite extent transverse to its principal longitudinal direction of flow. A line joining the centroids of two or more transverse cross-sections of a beam is an "axis" of the beam.

An "electron beam" is a directional flow of electrons.

An "electron microscope" is a type of analytic equipment in which a sample is illuminated by an electron beam, and resulting particles or electromagnetic radiation are used to form a spatially resolved image. A scanning electron microscope (SEM) images a sample surface based on reflected, secondary, or backscattered particles or radiation from one or more surfaces of the sample. Because beam interactions detected by a SEM occur at or near this surface, a SEM can operate on samples of arbitrary thickness. In contrast, a transmission electron microscope (TEM) images a sample volume based on transmitted electrons (including scattered electrons). A TEM operates on samples of about 10-150 nm thickness, which can be mounted on a grid for mechanical support and thermal conductivity; in turn the grid can be held in a sample holder. A TEM can provide resolution below 50 pm, SEM resolution is often limited to about 0.5 nm. In terms of magnification, a TEM can provide magnifications up to and exceeding 50 million, while SEM magnifications are usually limited to about 2 million. In this disclosure, scanning transmission electron microscopes (STEM), which perform imaging of transmitted electrons, are considered to be both SEMs and TEMs. The electron beam in an electron microscope can be generated in an electron gun, and accelerated, focused, or steered through a series of stages toward a sample chamber. Disclosed technologies can be used to form one or more lamellae for subsequent TEM analysis.

"Etching" refers generally to any subtractive process for removing material from a sample. Etching can expose one or more cut faces of a sample by removing material up to and on one side of the cut face. Non-limiting examples of etching techniques include laser etching, plasma etching, ion beam milling, and gas-assisted milling. While etching results in material removal, an etching process can include preparatory or intermediate operations that are additive. For example, a photoresist can be deposited onto a sample and patterned, so as to obtain a patterned etch in a subsequent operation.

A "focused ion beam" ("FIB") is a beam of ions whose focus can be controlled to direct the beam to a spot on a surface, or which can be swept over a sample in a sweep pattern. A FIB can be used for analysis, deposition, or removal of material at the incident spot. Some FIBs are used for milling. Commonly, a FIB comprises positive elemental ions, such as Xe+ or Ga+, however these are not requirements. Ion beam species such as Ga+ can be sourced from e.g., a liquid metal ion source (LMIS), while other ion beam species such as Xe+ can be produced in a plasma. A FIB produced with a plasma source can be termed a "plasma focused ion beam" ("PFIB"), and references to FIB herein include PFIB. Focused spot sizes in a range 2-100 nm diameter are achievable, with depth of focus commonly 20-50 µm.

A "localized operation" is an analysis operation performed over a finite region proximate to or encompassing an identified feature of a sample. The region can have a predefined spatial relationship to the identified feature, and a transverse extent less than a corresponding transverse extent of the sample. The analysis operation can be a sample preparation or material removal operation such as milling, etching, or polishing; or can be a diagnostic operation such as imaging or spectroscopy.

"Milling" is a material removal process over a path that is guided by movement (sometimes termed "sweep") of a milling tool relative to a sample being milled. A milling operation can expose one or more "cut faces" of a sample by removing material up to and on one side of the cut face. In examples, milling can be performed using a focused ion beam (FIB). Milling is a form of "etching", which refers more generally to any subtractive process for removing material from a sample. Diffuse chemical etching may not be considered as milling. However, ion beam assisted chemical etching can be site specific at the location of the ion beam, and can be regarded as milling. A "mill" (or "milling tool") is an apparatus capable of milling.

A "particle beam" is a beam comprising a directional flow of particles. A "particle" is a distinct unsubdivided unit of a flow of matter. Particles of common interest in this disclosure include charged particles such as electrons or ions (such as Ga, Xe, or protons), however particles are not limited thereto. Electrons in an electron beam are considered a different species than ions in an ion beam despite some ions containing bound electrons.

"Throughput" refers to a number of samples that can be successfully processed per unit of overall time, including sample preparation, sample handling, equipment setup, and individual processing of samples. Eliminating steps such as correlation between SEM and FIB perspectives can reduce time for individual sample processing and, by improving accuracy of lamella siting, can also improve yield, thereby advantageously improving throughput in two aspects. Further, a composite focus stacked image can facilitate quick feature selection (either interactively or by automated software) and an accompanying depth map can provide accurate placement of lamella milling patterns, with attendant improvements in throughput. As a general consideration, equipment setup and certain sample operations are performed in common for an entire microscopy grid or substrate, and therefore providing more sample sites within field of view of an analysis beam on a single grid or substrate (e.g. with grazing incidence FIB) can also result in improved throughput.

Example Analyzer

FIG. 1 is a diagram 100 of an example apparatus with which the disclosed technologies can be implemented. This apparatus can be used to perform imaging and milling operations on a sample, for lamella preparation or other applications. The illustrated apparatus can be an analyzer.

As illustrated, wall 110 defines chamber 152 within which analysis can be performed on sample 120. Electron beam column 106 can operate as a SEM, ion beam column 140 can operate as a FIB and, optionally, optical beam 150 can excite fluorescence within sample 120. Sample 120 can be mounted on stage 124 which can vary the position of sample 120 with multiple degrees of freedom (translation or rotation) using respective actuators (not shown). Sample stage 124 can be a micromanipulator.

Vertically mounted SEM 106 comprises electron source 102, condenser lens coils 104, objective lens coils 108, and can include additional beam controls such as scanning coils and apertures (not shown). With scanning coils unpowered, electron beam axis 130 can be used as a polar axis for the illustrated analyzer overall. Local coordinates can also be defined for individual subsystems or for sample 120.

FIB column 140 can be mounted obliquely, e.g. with ion beam axis 132 at an angle 52° (or, in a range 40°-60°) from electron beam axis 130. FIB tool 140 can include ion source 134, electrostatic or electromagnetic beam controls 136, 138, and can include additional beam control elements not shown, such as apertures or deflectors for scanning.

SEM 106 or FIB 140 can be controlled to set a desired working depth and further controlled to scan transversely. Commonly, the working depth can be set so that an instant ion beam or electron beam is focused at a surface of sample 120.

Sample stage 124 can be configured to position a major surface of sample 120 at shallow incidence of about 154 θ=10° (or, in a range 5°-30°) for oblique viewing as described herein. Detector 128 can collect signals which can form an image of sample 120. To illustrate, detector 128 can receive secondary or backscattered electrons or ions as electron beam 130 or ion beam 132 is scanned across sample 120. Exemplary secondary particle detectors include Everhart Thornley detectors and microchannel plates. In variations, secondary particle detector 128 can be annular about beam axis 130 or 132. As another illustration, detector 128 can be a camera used to record fluorescence from sample 120. Multiple detectors 128 can be provided in some examples (e.g., a detector 128 for fluorescence and a detector 128 for receiving electrons or ions). Other tools can also be provisioned within the illustrated apparatus, represented generically as probe 126. In some applications, a gas delivery tool can be included.

Controller 114 can control or monitor signals from detector 128 or tool 126 as shown. The same or another controller can similarly control or monitor signals from SEM 106, FIB 140, or stage 124. Controller 114 can be equipped with memory 112 to store programs executed by controller 114, and further store data input to or output from such programs.

Pump 116 can maintain chamber 152 at a pressure of about 10-9 to 10-4 torr, with any exhaust gases evacuated as indicated by arrow 118. A combination of turbomolecular pumps, mechanical pumps, or ion pumps can be used.

The apparatus of FIG. 1 can have a range of additional auxiliary components not shown, such as support structures, low-voltage or high-voltage power supplies, control electronics, or instrumentation. This apparatus is shown for purpose of illustration only. Disclosed technologies can readily be applied to other apparatus having more, fewer, or different components.

Example Mounting

Figure 2:
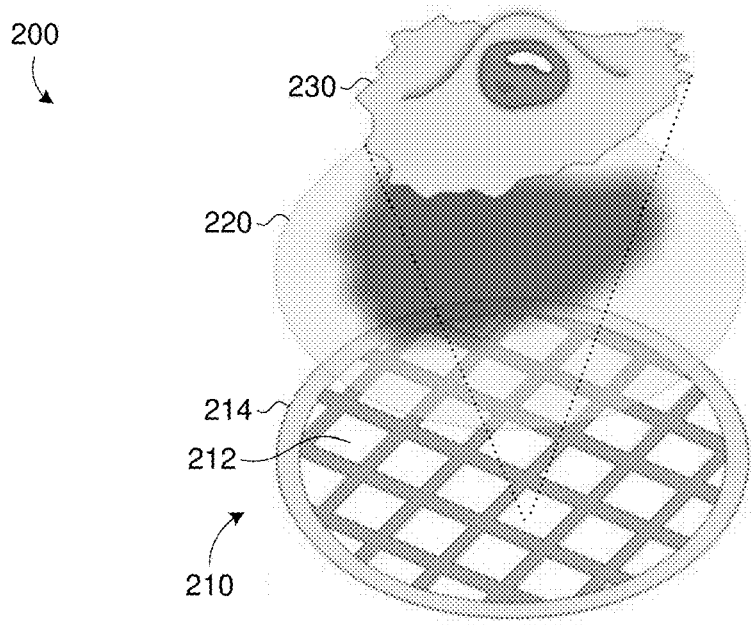
FIG. 2 is a diagram illustrating a sample mounting configuration for some examples of the disclosed technologies.

FIG. 2 is a diagram 200 illustrating a mounting configuration for biological cell samples. In this configuration, cells are provided mechanical support with minimal interference to any analysis beams that may be applied to the cells.

Grid 210 provides overall mechanical support, and can be handled with manual or robotic lab tools. Grid 210 can be directly mounted on a stage such as 124 of FIG. 1. As illustrated, grid 210 has an overall diameter of about 3 mm and a 250 mesh pattern of gold wires forming openings 212 of about 100 μm square within solid ring 214. Other grid patterns and sizes can be used. Other materials can also be used, such as copper, gold, nickel, rhodium, or a composite thereof. The wire pattern can occlude about 20-50% of the area inside ring 214, leaving a substantial remaining area unblocked and available for TEM imaging.

Grid 210 can be covered with thin sheet 220 to provide cell support over openings 212. As illustrated, sheet 220 is a continuous carbon film about 20 nm thick, strong enough to support cell samples over a 100 μm grid opening 212, yet thin enough to permit TEM imaging through sheet 220. Other thicknesses (e.g. 10-100 nm) and materials can also be used. A perforated film can also be used, sometimes termed a "holey" film.

Cells 230 can be deposited over film 220, either placed intentionally within respective grid openings 212, or scattered over film 220. Cells 230 have variable shapes with dimensions commonly about 2-5 μm. Even without intentional positioning, many cells can end up suitably positioned for TEM imaging over a grid opening 212, because beam occlusion by grid wires is relatively low. Areal density of cells 230 can be selected based on cell size and application requirements. To improve throughput, multiple TEM samples can be prepared over a single grid opening 212.

Example Beam and Sample Configuration

Figure 3:
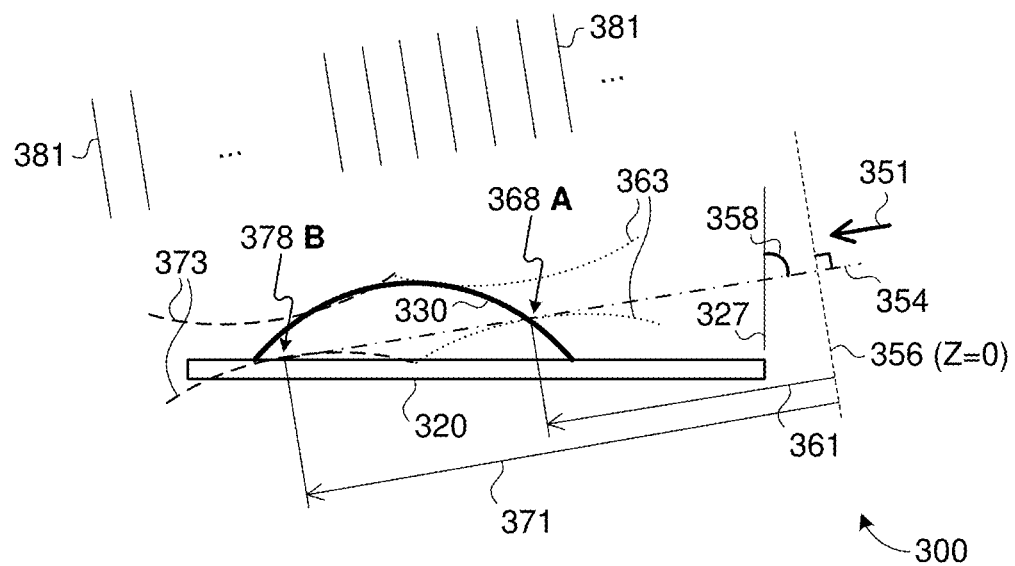
FIG. 3 is a diagram of an example beam and sample configuration illustrating the disclosed technologies.

FIG. 3 is a diagram 300 of an example beam and sample configuration illustrating applicability of the disclosed technologies. FIG. 3 shows how factors such as a grazing incidence ion beam, topographic features at the sample surface, and ion beam depth of focus can combine to adversely affect lamella milling accuracy and thereby yield and throughput.

As shown, cell 330 is supported on film substrate 320. A FIB is directed toward cell 330 as indicated by arrow 351. The FIB has a beam axis 354 and transverse reference plane 356 can serve as a datum for depth values (e.g. Z=0). Cell 330 forms a topographic feature over substrate 320, as a result of which true depth 361 can be significantly less than the depth 371 expected in the absence of any height variation.

The disclosed technologies enable accurate determination of depth 361 through focus stacking of a series of images over a range of working depths Z.

With correct depth 361, milling can be precisely configured as shown by dotted beam profile 363, e.g. with an offset equal to the beam waist radius, to precisely mill cell 330 beginning at point A 368 or at any other desired starting position.

In existing approaches using e.g. dynamic focusing, depth can be estimated based on known angle of incidence 358 relative to surface normal 327 of substrate 320. A resulting beam pattern 373 having a waist at point B 378 may be significantly in error at the actual depth 361.

FIG. 3 is merely illustrative. Actual lamella milling patterns may begin, not at point A 338, but away from this point. Nevertheless, the principle remains applicable, and accurate knowledge of depth 361 through the disclosed technologies can directly improve milling accuracy, lamella yield, and overall throughput.

It should be noted that, although the illustration of FIG. 3 is not to scale and exaggerated in some respects, the tolerance requirements for a 10-200 nm thick lamella are very tight, and even a 1 μm error in depth for a FIB with 20 μm depth of focus, can lead to 10-100 nm error in transverse position of a milled edge, which can impair successful production of the lamella.

Also shown in FIG. 3 are a set of planes 381 at respective working depths Z. In examples of the disclosed technologies, a series of images can be acquired at each of planes 381 and used as input to a focus stacking procedure as described herein. Planes 381 are shown offset from substrate 320 and cell 330 for clarity of illustration. In practice, images in these planes can extend to include substrate 320 and cell 330 in the fields of view.

Example Pattern Milling

Figure 4:
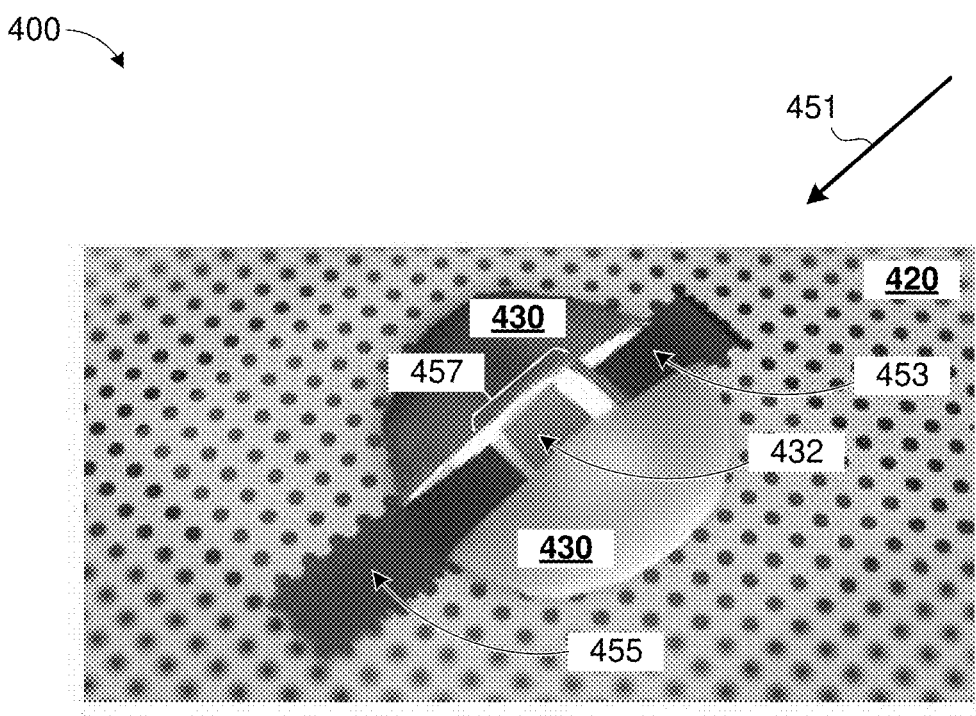
FIG. 4 is an illustration of pattern milling in an example of the disclosed technologies.

FIG. 4 is a photograph 400 of an artist's model illustrating pattern milling of a cell according to the disclosed technologies. Photograph 400 shows cell 430 fixed on perforated film support 420. Photograph 400 has a viewing axis tilted about 20° from a surface normal of film 420.

As seen in FIG. 4, lamella 457 is being prepared containing a slice of cell nucleus 432. Dark regions 453, 455 are FIB milled patterns. The FIB beam axis is represented by arrow 451. Pattern 453 has been milled where shown and also underneath lamella 457. Pattern 455 has been milled above lamella 457. Both patterns 453, 455 penetrate through cell 430 and through support film 420.

First Example Application

Figure 5:
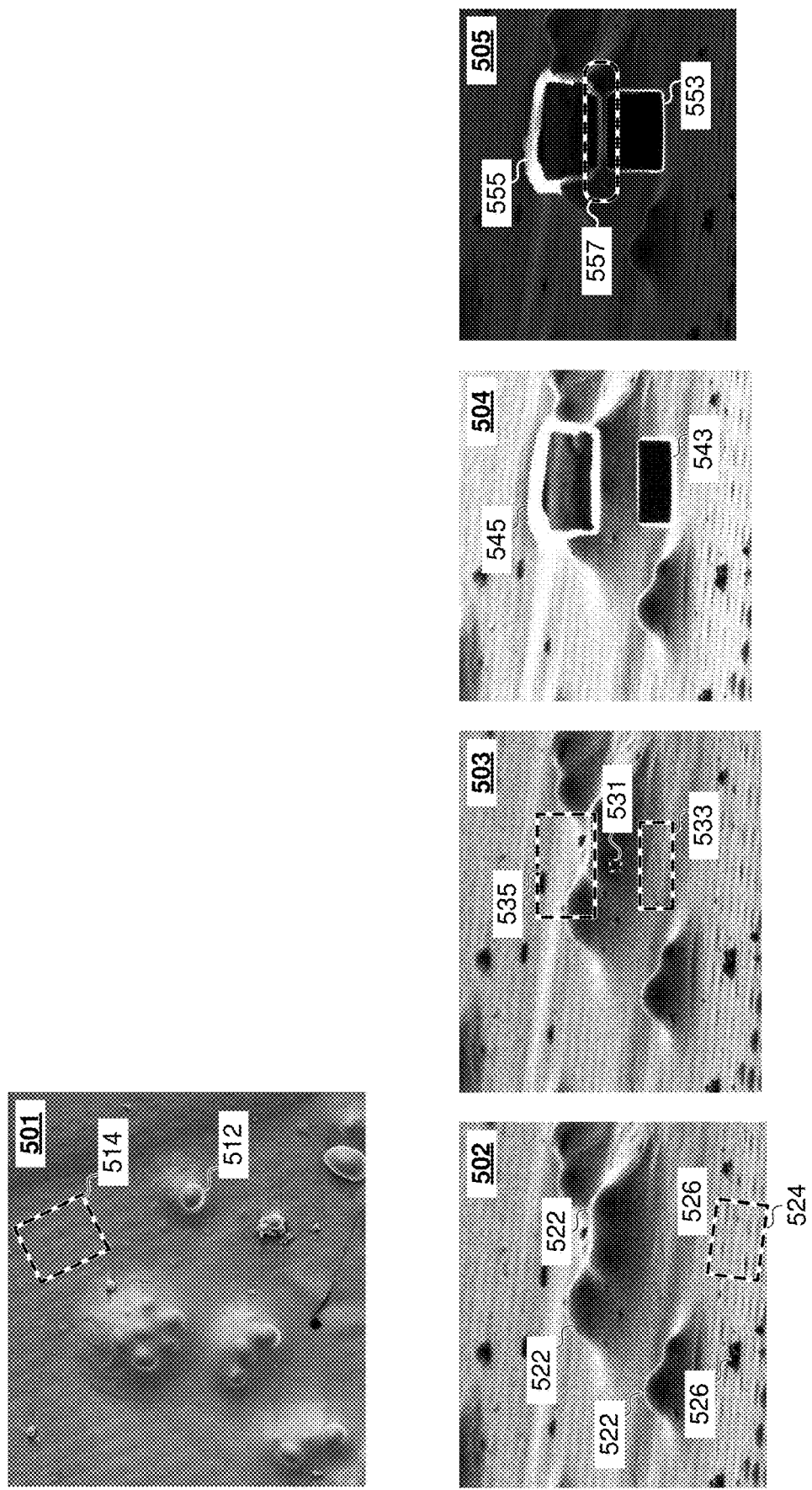
FIG. 5 is a set of images showing a first example application of the disclosed technologies.

FIG. 5 is a set of images 501-505 showing a first example application of the disclosed technologies in a cryogenic lamella preparation workflow. Initially, cells can be deposited on a support structure (e.g. similar to that of FIG. 2) and cryogenically fixed e.g. by plunge freezing.

SEM image 501 is taken from above, with an electron microscope in a configuration similar to that shown in FIG.

1. Numerous cells 512 are discernible, as well as background pattern 514 reflecting a pattern of perforations in a support film similar to 220 of FIG. 2.

FIB image 502 shows a substantially similar scene as image 501, from an oblique viewing axis similar to the FIB and sample configuration of FIG. 1. Cells 522, perforation pattern 524, and impurities 526 are discernible.

FIB image 503 is a copy of image 502, on which a feature 531 (e.g. a centroid of a cell) has been selected for lamella preparation, and two mill patterns 533, 535 have been positioned. Because a same FIB can be used for imaging and milling, correlation between the respective perspectives of different tools can be avoided, and placement of mill patterns 533, 535 can be performed efficiently.

FIB image 504 shows the same scene as images 502-503, after partial milling of patterns 543, 545. Pattern 543 has milled clear through the support film, while pattern 545 still has material beyond the milled depth. Bright outlines of patterns 543, 545 are imaging artifacts showing the positions of edges of the milled patterns 543, 545.

Finally, FIB image 505 shows the same scene as the preceding images 502-504 after completion of milling and polishing. Thin lamella 557 (about 10 nm thick) remains between patterns 553, 555. Lamella 557 and patterns 553, 555 can be similar to lamella 457 and milled patterns 453, 455 described in context of FIG. 4.

Example Methods

Figure 6:
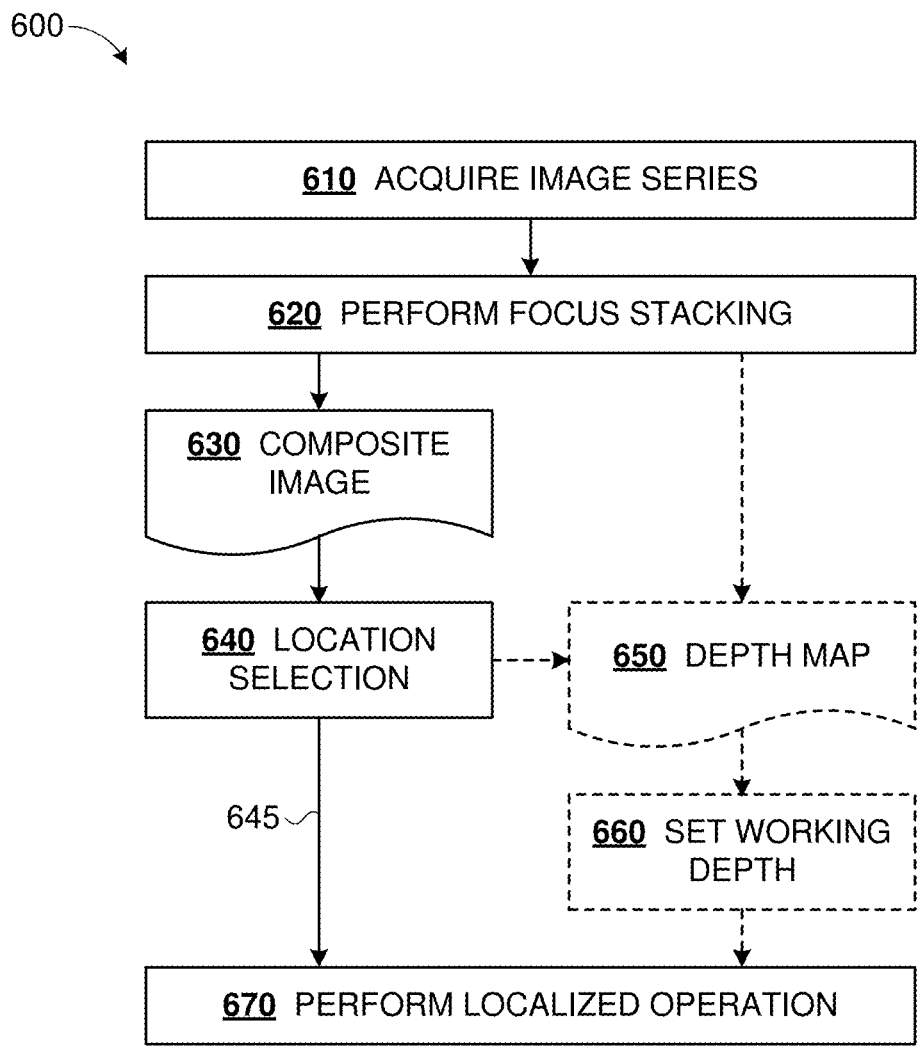
FIG. 6 is a flowchart depicting example methods according to the disclosed technologies.

FIG. 6 is a flowchart 600 depicting example methods according to the disclosed technologies. In these methods, a localized operation is performed on a sample, based on output from a focus stacking technique applied to images of the sample at varied focus depths.

A first method begins at process block 610, where multiple images of the sample can be acquired at respective focus depths. In examples, a FIB or a fluorescence microscope can be used to acquire the images, but this is not a requirement, and other imaging modalities can be used. The images can be acquired over a predetermined set of working depths, which can be acquired in sequence (e.g. 0, 20 µm, 40 µm, 60 µm, . . . relative to an arbitrary starting depth) or in an irregular depth scan (e.g. 0, 60 µm, 80 µm, 20 µm, 100 µm, . . . ) In some examples, an initial image can be acquired using an auto-focus mode of an imager, with successive images acquired by subsequent adjustments of working depth from the auto-focused configuration. To mitigate beam drift or other temporal variations, multiple images can be acquired at each working depth setting and combined, e.g. by registration of one or more fiducials and averaging.

At block 620, focus stacking can be performed on the images acquired at block 610, to generate composite image 630 which can have a range of depths in focus. To illustrate, in a case where the individual images were acquired at working depths ranging from z1 to z2, composite image 630 can have features at all depths [z1, z2] in focus. Square bracket notation [z1, z2] denotes a closed interval including both endpoints z1, z2. Illustrative examples of focus stacking are described further herein.

The first method proceeds to process block 640, where an indication of a location selection can be received. In varying examples, location selection at block 640 can be performed interactively or by automated software. In the former case, a user can select a point or zone of composite image 630 on a display using a mouse or similar pointing device, thereby selecting a corresponding location on the physical sample. In the latter case, automated software can apply machine vision techniques to discern edges, shapes, or objects on the composite image. The selected location can correspond to a discernible feature in the composite image, which can be a representation of an object (such as a cell, fluorophore, a structure, or a pattern shape) or an attribute of such an object (e.g. an edge, a centroid, an extremum of image intensity, or a vertex of a bounding polygon).

The first method follows arrow 645 from block 640 to block 670, where a localized operation can be performed based on the selected location. A wide range of operations can be performed at the selected location, over a region encompassing the selected location, at a position having a predetermined offset from the selected location, or over a region having a predetermined spatial relationship to the corresponding position. The predetermined offset can be defined with reference to beam coordinates, e.g. a transverse offset from a viewing axis passing through the selected location, or with reference to sample coordinates, e.g. a transverse offset from a surface normal passing through the selected location. Non-limiting examples of such operations can include: marking the location, e.g. with a milled indentation, cross, or other marker; pattern milling, e.g. for lamella formation; other etching operations; electron or optical spectroscopy; or other metrology operations. The localized operation can be part of a workflow for manufacturing a lamella incorporating the selected location. The localized operation can also include subsequent TEM analysis on a lamella prepared at the selected location, or other microscopy. The localized operation can be performed by a suitable tool, non-limiting examples of which can include a mill, an etcher, an electron microscope, an electron spectrometer, an optical microscope, or an optical spectrometer.

A second method can also be described with reference to FIG. 6. Extensions to the first method are shown by dashed line in FIG. 6. The second method can follow the first method from blocks 610 through 640. However, for the second method, focus stacking at block 620 can also generate depth map 650 to accompany composite image 630. Particularly, depth map 650 can provide a depth value for any pixel of composite image 630. In some examples, depth map 650 can be represented as an image, such that every first pixel in composite image 630 has a corresponding second pixel in depth map 650, the value (pixel intensity) of which represents depth to the sample surface at the location of that first pixel. Second pixels of depth map image 650 can have a 1:1 relationship to first pixels of composite image 630, but this is not a requirement, and depth map 650 can be downsampled to a smaller representation with fewer pixels than composite image 630. Additionally, other representations of depth map 630 can be employed, such as a contour map or a look-up table. Because granularity of depth values can be coarser than that of pixels in composite image 630, run length coding or another compression scheme can advantageously reduce the size of depth map 650. In some examples, depth map 650 can store depth values relative to a view plane orthogonal to the viewing axis of an imaging beam (as illustrated for depths 361, 371 in FIG. 3), while in other examples depth values in map 650 can be relative to a reference plane generally parallel to a "top" major surface of the sample. In the latter case, a perfectly smooth surface would have uniform depth values over the entire field of view, and variations in depth reflect topographic variations of the sample surface.

Thus, the second method can use the selected location from block 640 and ascertain a corresponding depth value from depth map 650. At block 660, this depth value can be used to set a working depth of the tool which will perform localized operation 670. Then, the second method proceeds to block 670 where, like the first method, the localized operation can be performed.

In some examples, the working depth can equal the depth value at the selected location, but this is not a requirement, and one or more offsets can be applied. To illustrate, a FIB with 40 μm depth of focus set to a working depth Z μm can provide milling with acceptable tolerance from Z−20 μm to Z+20 μm. Accordingly, if a depth value to the sample surface is 80 μm, milling can be commenced with working depth set to 100 μm, thereby requiring fewer adjustments of the FIB as milling progresses. As another illustration, a milling operation can be performed at a transverse displacement of 10 μm from the selected location, as illustrated e.g. in FIG. 5. Accordingly, a depth value can be read from depth map 650 at an offset from the selected location rather than at the selected location itself. Still further, four corners of a pattern mill can have 60, 80, 90, 70 μm depths, which can be averaged together to set working depth to a mean (60+80+ 90+70)/4=75 μm. Multiple such offsets can be applied together. Offsets, the use of an oblique reference surface, or other scaling can be implemented by applying a linear transformation to a depth value stored in depth map 650.

Numerous variations and extensions can be implemented within the scope of disclosed technologies, some of which are described above in context of the first and second methods, some are described immediately below, and others are described elsewhere herein.

In examples, automated selection of a location in a composite image can be performed by software trained by machine learning, e.g. using a training dataset of images and selected feature locations.

In examples, the localized operation can be performed using one or more beams, such as an ion beam, a plasma focused ion beam, an electron beam, or an optical beam. Such a beam can be directed onto the sample along a beam axis having angle of incidence in any range: 70°-85°, 60°-87°, 0°-15°, 15°-40°, or 40°-60°. In varying examples, the localized operation can be performed at the selected location, at a predetermined transverse offset from the selected location, at a predetermined depth offset from the selected location, over a region including the selected location, or over a region having a transverse offset or depth offset from the selected location. Transverse offsets can be in either beam coordinates or sample coordinates. The working depth set at block 660 can be dynamically adjusted as the localized operation is performed at block 670, with or without additional sample imaging.

Images can be acquired by or from an imager, which can include an ion microscope, an electron microscope, an optical microscope, a secondary electron detector, a secondary ion detector, or a photodetector. The imager can illuminate the sample using one or more beams, such as an ion beam, a plasma focused ion beam, an electron beam, or an optical beam. Such a beam can be directed onto the sample along a beam axis having angle of incidence in any range: 70°-85°, 60°-87°, 0°-15°, 15°-40°, or 40°-60°.

Samples of interest can include a cryogenic sample, a plunge-frozen sample, a biological sample, a semiconductor sample, or a nanostructure.

Example Focus Stacking

Figure 7:
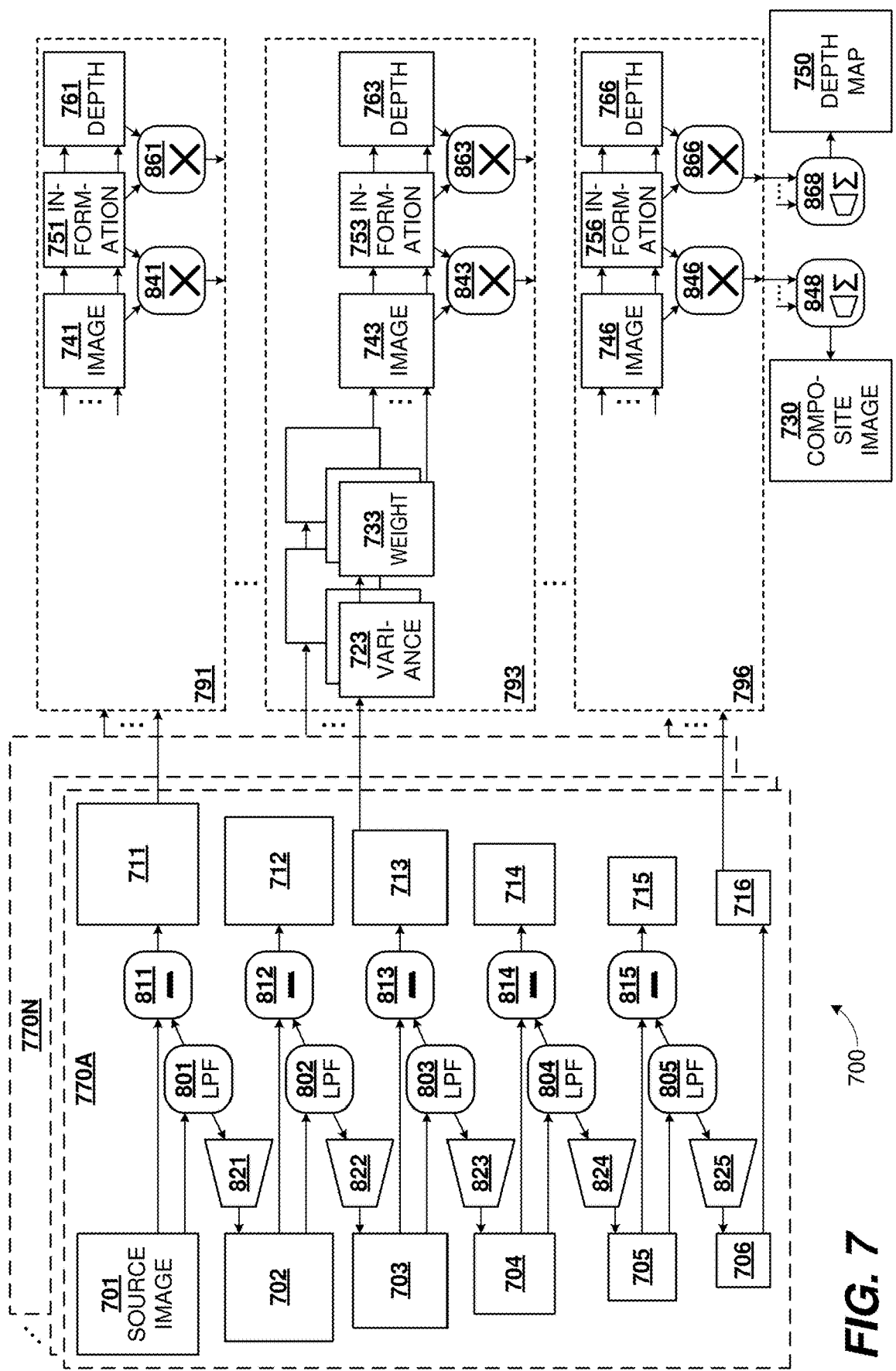
FIG. 7 is a flowchart of a focus stacking method which can be used with the disclosed technologies.

FIG. 7 is a flowchart 700 of a focus stacking method which can be used with the disclosed technologies. The method begins with a set of source images focused at different depths. For convenience of description, the term "slice" can be used to refer to each imaged working depth, the corresponding source image, and associated processing. The set of source images is processed to obtain (i) a composite image in which features at different depths are all in focus, and (ii) a depth map indicating a depth value for features in the composite image. FIG. 7 illustrates one exemplary method of focus stacking using a Laplacian pyramid technique, however use of this technique is not a requirement, and other focus stacking methods can be used as part of the disclosed technologies.

The illustrated technique can be conceptually regarded as comprising input side processing, intermediate processing, and output side processing, all of which are represented in FIG. 7. Initially a plurality of source images 701 can be acquired at respective working (focus) depths.

Generally, the set of images 701 contain information in the form of features. The information may be distributed across three spatial dimensions (two dimensions in the plane of each image 701, the third dimension being depth across slices 770A-770N) and may also have varying scale length, which may not be known a priori. When the image is analyzed at fine resolution, a coarse-grain feature may appear as smoothly varying pixel intensities, and coarse features can be missed. Conversely, a fine-grain feature may be lost due to smoothing when the image is analyzed at coarse resolution. To overcome such issues, decomposition can separate information in original image 701 according to length scale, and each length scale can be processed at an appropriate resolution. Intermediate results at the various length scales can be combined to obtain one composite image and, optionally, a corresponding depth map.

A. Input Side Processing

Input side processing performs the decomposition, shown for a first slice in dashed outline 770A, with other slices indicated behind slice 770A. That is, each slice 770A-770N has a respective source image 701 which can be decomposed into a set of images 711-716.

As illustrated, low-pass filter (LPF) 801 is applied to image 701, and the output subtracted from image 701 by subtractor block 811, leaving 711 containing information in the highest spatial frequency band (dubbed "octave") of source image 701. Because low-pass filtering removes high frequency content from source image 701, the output of LPF 801 can be decimated or downsampled by block 821 to generate a smaller image 702. Illustratively, a 1024×1024 source image 701 can be downsampled /2 to obtain a 512×512 image 702.

This procedure can be iteratively applied to obtain successively lower frequency bands of information in high pass images 711-715, and successively lower frequency versions of source image 701 in downsampled images 702-706. Repetitive details of the several iterations are omitted, other than to note that LPF blocks 802-805, subtraction blocks 812-815, and downsampler blocks 822-825 operate in similar fashion as blocks 801, 811, 821 described above, albeit with smaller images. The last downsampled image 706 can be retained intact as image 716 containing all residual lower frequency information. In the illustrated example, the decomposition can produce images of sizes 1024×1024 (711), 512×512, 256×256, 128×128, 64×64, and 32×32 (716).

With suitable choice of cutoff spatial frequency for LPF 801, any residual high-pass information in its output can be insignificant, and downsampling at block 821 can be substantially lossless, meaning that the decomposition of source image 701 into image pair 711, 702 can also be lossless, and similarly for the subsequent stages of decomposition. That is, images 711-716 could be combined (with suitable upsampling) to recover source image 701 to a high degree of accuracy.

This decomposition, with five stages of /2 downsampling, is merely illustrative. Fewer or more stages can be used. Downsampling by smaller or larger factors can be used. Different stages can use different downsampling factors.

The described decomposition can be replicated across all slices 770A-770N to complete the input side processing.

B. Intermediate Processing

The description turns to intermediate processing, which performs fusion across slices. Whereas input side processing was organized by slice (depth), intermediate processing can be organized by scale length or spatial frequency band. That is, all slices' 711 images are processed together, and similarly for images 712, images 713, and so on.

Dashed outline 793 illustrates the intermediate processing for images 713. Within each image 713, variance can be computed at each pixel to obtain variance matrix 723. As illustrated, there is one variance matrix 723 for each slice 770A-770N. Variance can be calculated over e.g. a 5×5 pixel zone of image 713, centered at an instant pixel. To illustrate, variance for a pixel at (row, column)=(10, 20) can be calculated over a zone of pixels in rows 8-12 and columns 18-22. Near the edge of image 713, variance can be calculated over those pixel positions that are within the image. To illustrate, variance for pixel (2, 1) can be calculated over a zone of pixels in rows 1-4 and columns 1-3.

Then, at each pixel position, variances across slices can be compared and weights assigned accordingly. A slice 723 having the highest variance can have the most information and can be accorded the highest weight, while slices 723 with progressively lower variances can be assigned progressively lower weights. In some examples, weight can be equal to variance while, in other examples, other monotonic functions of variance can be used, such as power law, exponential, piecewise linear, or other functions. Weights can be stored in weight matrices 733 having the same organization as images 713 and variance matrices 723. As illustrated, there is one weight matrix 733 for each slice 770A-770N. Optionally, weights can be normalized so that, for any given pixel, the sum of weights across all slices' 733 is one. Letting B, W denote decomposed image 713 and weight matrix 733 respectively, the following formula can be used to calculate weight W for an N×M pixel zone about pixel (r, c), where M/2, N/2 are understood as integer parts $\lfloor M/2 \rfloor$, $\lfloor N/2 \rfloor$ respectively.

$$W(r, c) = \frac{1}{N \cdot M} \sum_{i=-\frac{N}{2}}^{\frac{N}{2}} \sum_{j=-\frac{M}{2}}^{\frac{M}{2}} \left( B(r+i, c+j) - \frac{1}{N \cdot M} \sum_{i=-\frac{N}{2}}^{\frac{N}{2}} \sum_{j=-\frac{M}{2}}^{\frac{M}{2}} B(r+i, c+j) \right)^2$$

Next, variance matrices 723 and weight matrices 733 can be combined across slices. Partial image 743 can be calculated as the weighted sum over decomposed image slices 713. Letting E denote partial image 743, with s, r, c denoting slice, pixel row, and pixel column respectively, and presuming weights to be normalized, an equation like $$E(r, c) = \sum_s W_s(r, c) \cdot B_s(r, c)$$

can be used to calculate pixel values of partial image E 743.

Partial depth map F 763 can be calculated using the depths $Z_s$ of the respective slices, using an equation such as $$F(r, c) = \sum_s W_s(r, c) \cdot Z_s$$

In a variation, index s can be used in place of $Z_s$, with linear transformation from slice index to physical depth performed later. Partial images E, e.g. 741, 746, and partial depth maps F, e.g. 761, 766 can be calculated similarly for other scales from corresponding decomposed images, e.g. 711, 716, as indicated by processing modules 791, 796 shown in dashed outline.

In order to combine the several partial images 741-746 into a single composite image, an information matrix 753 can be derived and used to assign weights to pixels of partial image 743. In some examples, an element of information matrix 753 can be a maximum among corresponding elements of variance matrices 743 over all slices. Denoting variance matrices 743 as V and information matrix 753 as G, an equation such as the following can be used.

$$G(r, c) = \max_s(V_s(r, c))$$

In other examples, other formulae can be used. As an illustration, the variance values $V_s(r,c)$ can be fitted to a Gaussian function of $Z_s$ (or another bell-shaped curve), and the peak of the fitted curve can be used as information value G(r,c).

Information matrices for other scales, e.g. 751, 756) can be calculated in similar manner.

With partial images E 741-746, partial depth maps F 761-766, and weights for combining them in the form of partial information matrices G 751-756, the intermediate processing stage is complete.

C. Output Side Processing

The description continues to output side processing, in which the results of intermediate processing can be fused across length scales to obtain one composite image and, optionally, its corresponding depth map.

The intermediate results can be partially combined at each scale as indicated by multiplier blocks 841-846 and then added, with suitable upsampling, at block 848 to obtain composite image 730. Letting subscript L denote the several length scales of intermediate processing modules 791-796 (e.g. the length scales of decomposed images 711-716), (r', c') denote upsampled pixel coordinates matching source images 701, U denote an upsampling function from (r, c) to (r', c'), and H denote composite image 730, the overall calculation can be represented by an equation such as $$H(r\dot{c}, c\dot{c}) = \sum_L U(G_L(r, c) \cdot E_L(r, c))$$

In this equation, the inner multiplication can be performed by multipliers 841-846, while upsampling and summation can be performed by block 848.

A similar procedure can produce depth map 750. Denoting depth map 750 as J, the overall calculation can be represented by an equation such as $$J(r', c') = \sum_L U(G_L(r, c) \cdot F_L(r, c))$$

All or parts of the techniques of FIG. 7 can be used for implementation of focus stacking in various methods and applications described herein. However, the disclosed technologies are not so limited, and variations or extensions of FIG. 7 can also be employed.

D. Illustration of Focus Stacking Results

Figure 8:
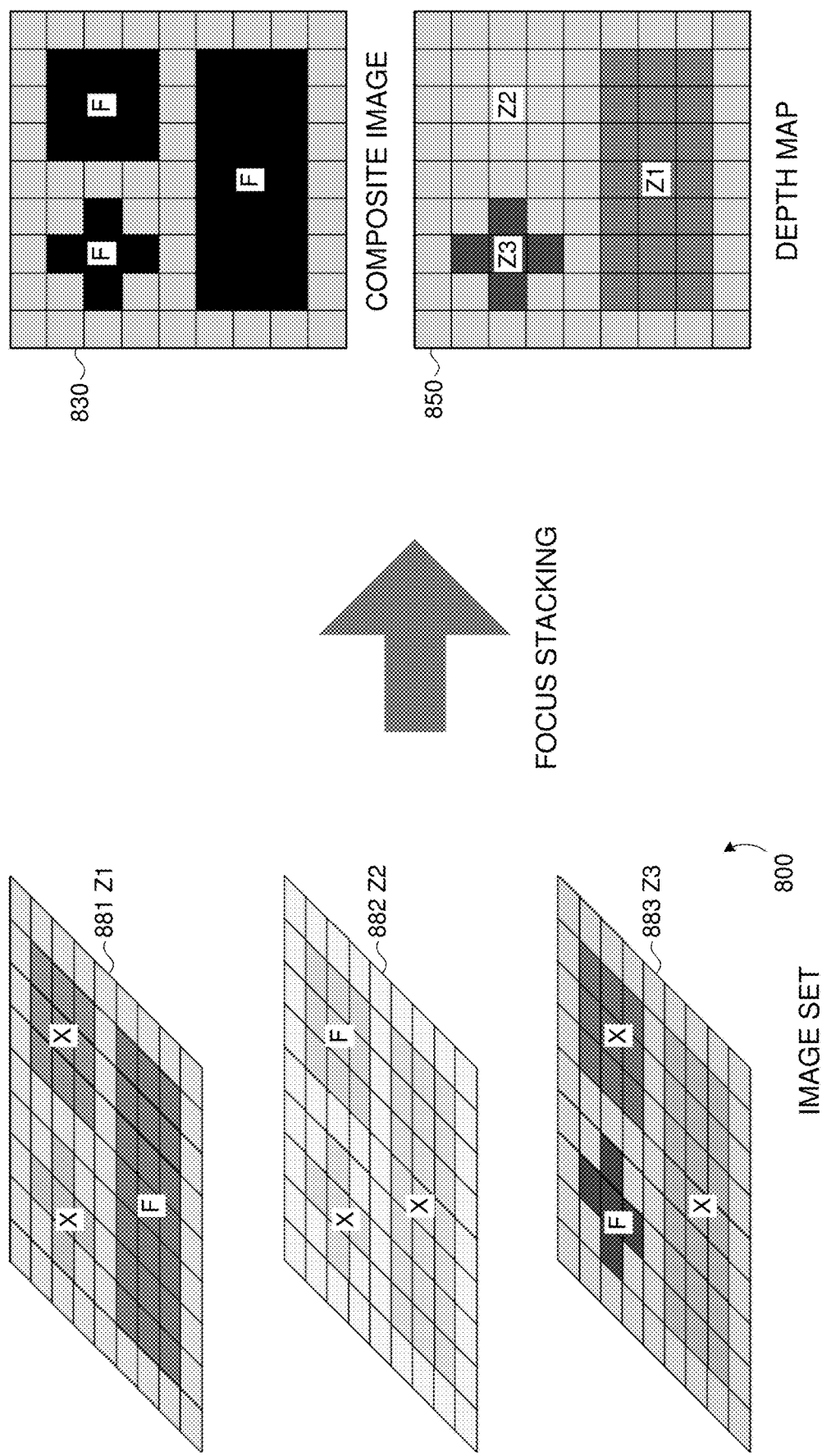
FIG. 8 is a diagram illustrating generation of a focused image and a depth map in an example of the disclosed technologies.

FIG. 8 is a diagram illustrating generation of a focused image and a corresponding depth map. In this diagram, a set of three images is combined to obtain a composite image having focused representations of objects from each of the three images, as well as a depth map indicating the depth of each of the objects. Annotations are provided for clarity of illustration, and are not part of the images shown.

On the left, image set 800 includes images 881-883, acquired with working depths Z1, Z2, Z3 respectively as indicated. The imaged scene includes three geometric shapes—a cross, a square, and a rectangle. For clarity, each shape is annotated with an "F" indicating that it is in focus, or an "X" indicating that the shape is out of focus. Thus, the rectangle, square, and cross are respectively in focus at working depths Z1, Z2, and Z3. As described herein, focus stacking can be applied to image set 800 to obtain composite image 830 and depth map 850. In composite image 830, all three shapes appear in focus, as indicated by the "F" annotation. Depth map 850 stores the depth Z1 corresponding to image 881 in which the rectangle shape is in focus, as indicated by annotation "Z1". Similarly, depth values "Z2", "Z3" stored for the square and cross shapes indicate the depths at which these shapes are in focus in image set 800.

Second Example Application

Figure 9:
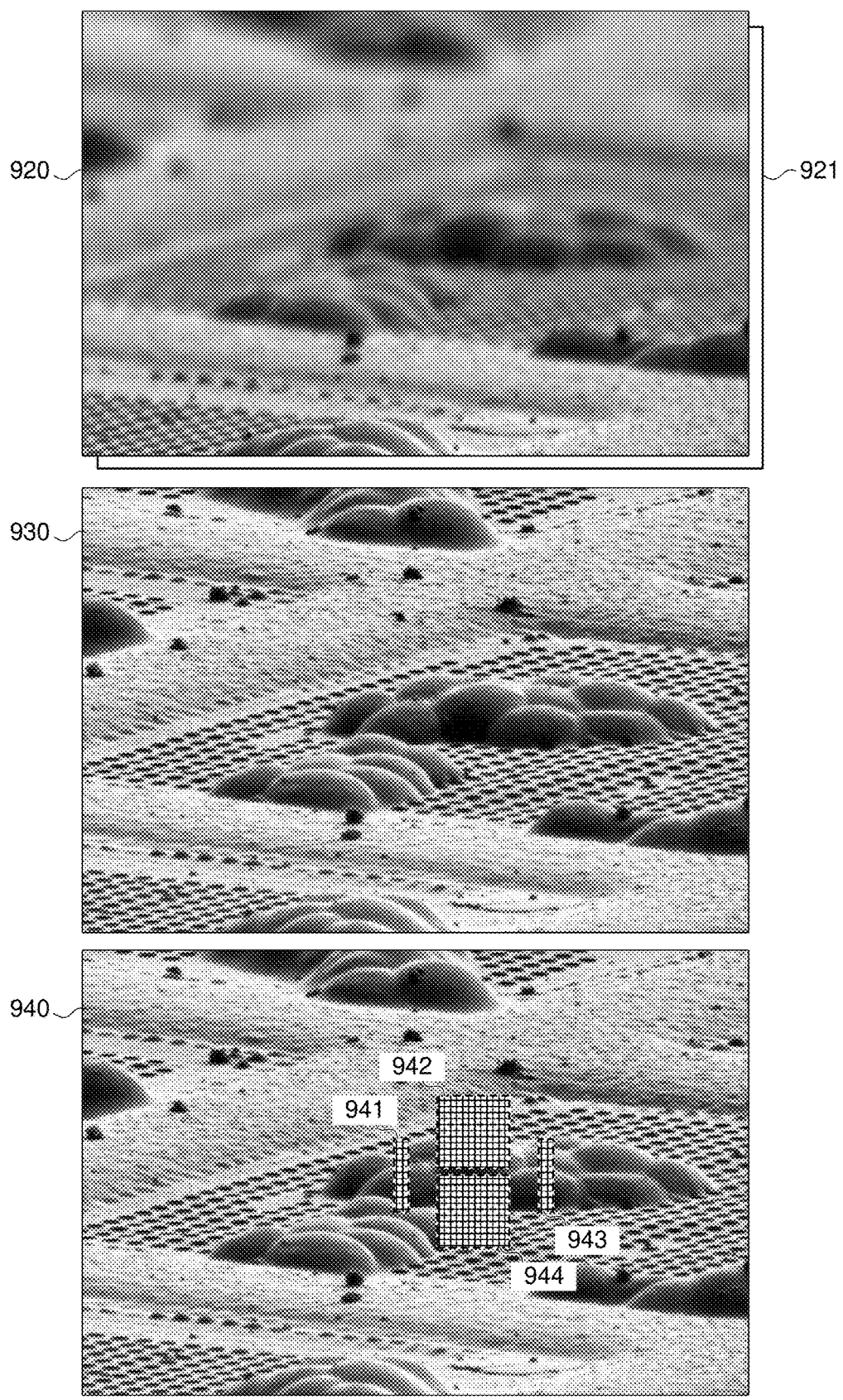
FIG. 9 is a set of images illustrating focus stacking in a second example application of the disclosed technologies.

FIG. 9 is a set of images 920, 930, 940 illustrating a second example application of focus stacking. In this example, focus stacking is applied to a set of source images to produce a composite image, with which patterns are placed for milling a lamella.

Initially, image 920 is one of a set of source images, as acquired by an imager, at a particular working depth. As shown, the foreground is in focus, while the background is not. Rectangle 921 represents other source images of the set, each focused at a respective working depth.

Through application of focus stacking as described herein, composite image 930 can be obtained, in which all features from foreground to background are seen to be in focus.

Image 940 is a copy of composite image 930 on which four FIB milling patterns 941-944 have been marked. Execution of these milling patterns can form a lamella between patterns 942, 944 as described in context of image 505 of FIG. 5, also FIG. 4.

Third Example Application

Figure 10A:
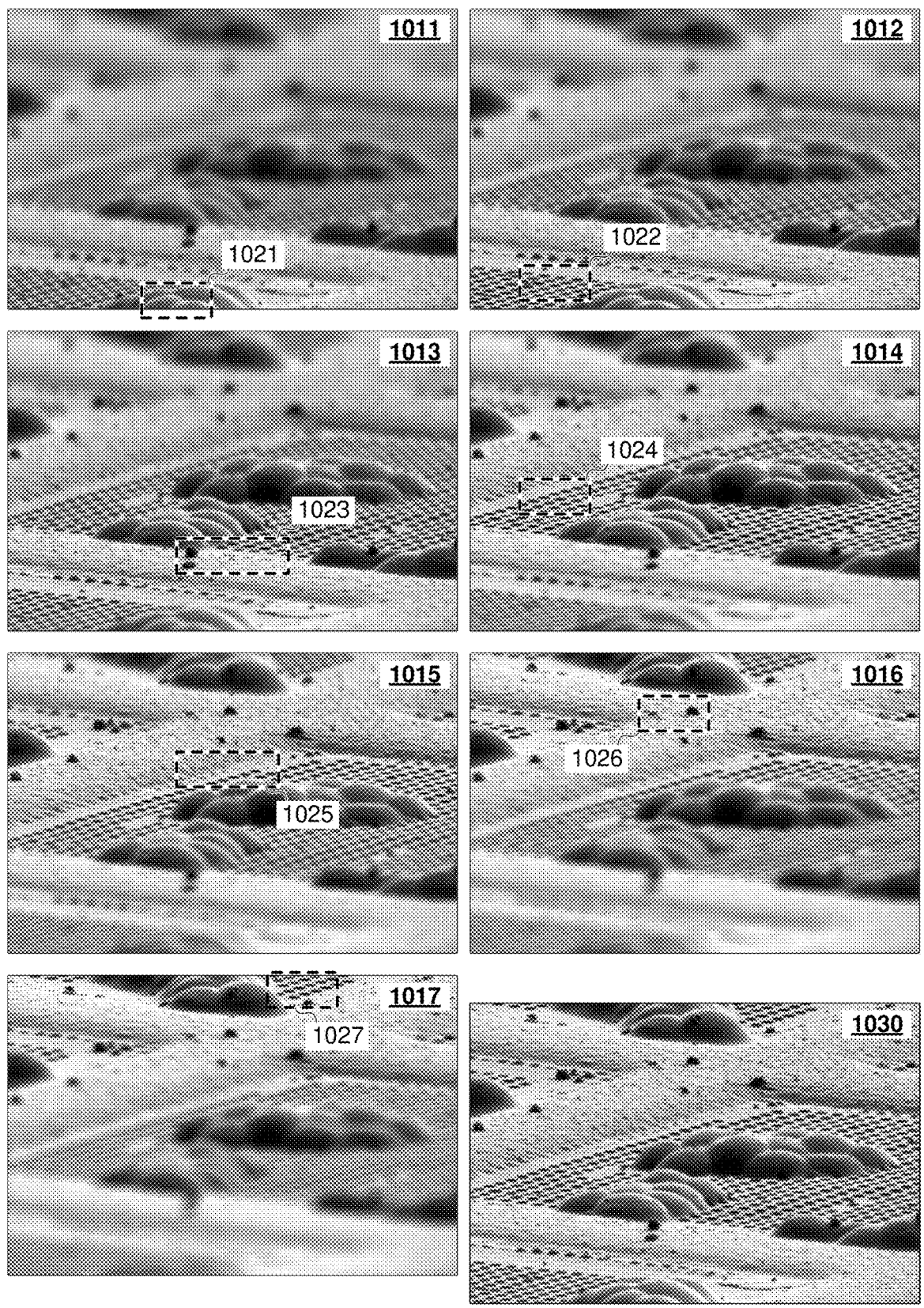
FIG. 10A-10B together provide a set of images illustrating focus stacking in a third example application of the disclosed technologies.
Figure 10B:
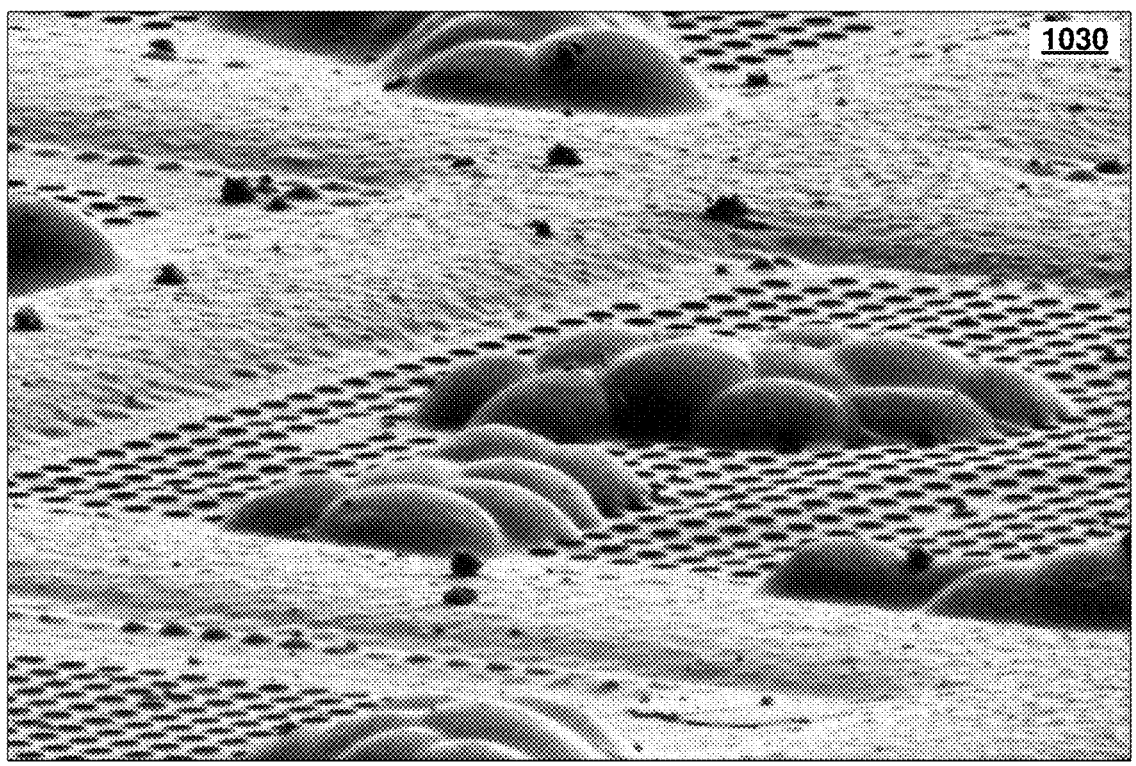
Figure 10B:
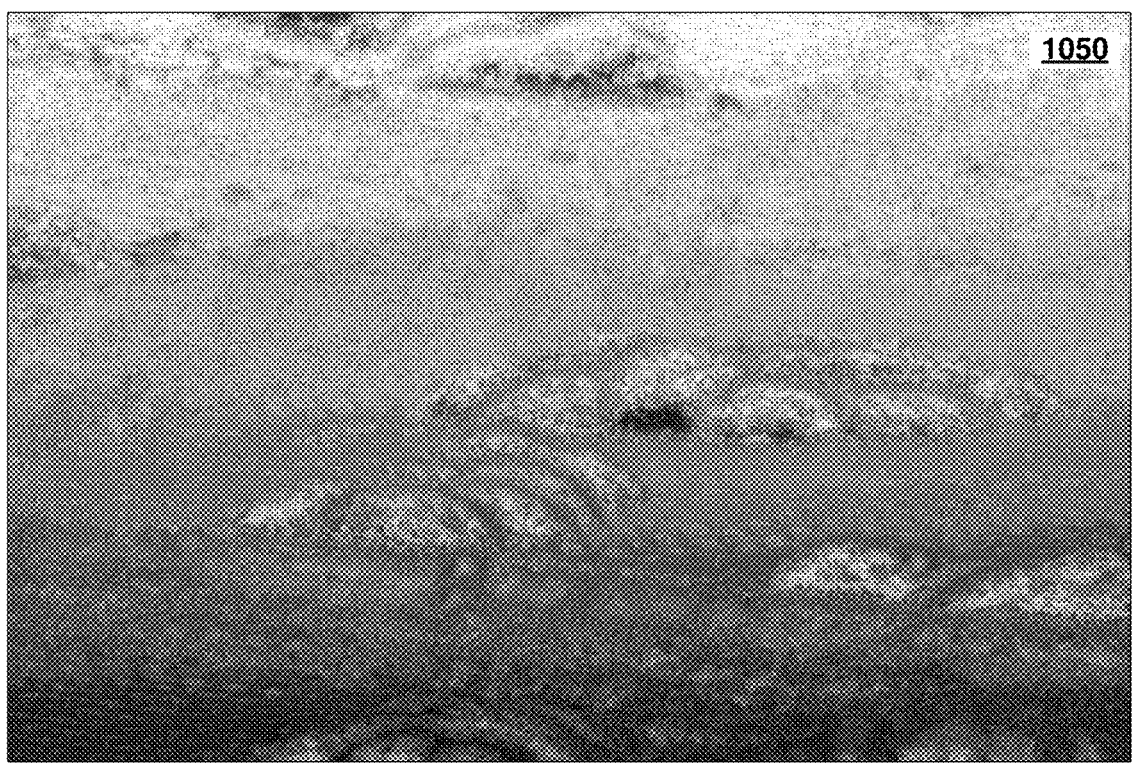

FIGS. 10A-10B together provide a set of images 1011-1017, 1030, and 1050 illustrating a third example application of focus stacking. Images 1011-1017 are a set of FIB images for respective working depths and in which respective zones are in focus. As a visual aid, exemplary zones 1021-1027 have been marked in images 1011-1017 respectively, to show features in focus in the several images. Focused zones 1021-1027 can be seen to progressively recede from foreground to background as working depth increases from image 1011 to 1017. Image 1011 has the lowest value of working depth among images 1011-1017, and focused zone 1021 is the most in the foreground among zones 1021-1027. Furthermore, zone 1021 can be seen to deteriorate in focus progressing from image 1012 to image 1017. Image 1017 has the greatest working depth, and background zone 1027 is in focus. Zone 1027 is not in focus in image 1011.

Application of focus stacking to images 1011-1017 can generate composite image 1030 and depth map 1050. Composite image 1030 (included in both FIGS. 10A-10B) shows all zones in focus, from foreground to background. Depth map 1050 shows topographic relief of features visible in composite image 1030, relative to a reference plane. Generally, cells which are raised above the perforated film visible in image 1030 also have lower depth values than their zones would have in the absence of the cells (e.g. imaging just the perforated film). This depth reduction appears as lighter colored zones in depth map 1050. For visual effect, depth map 1050 uses a reference plane which is tilted slightly relative to the major surface of the bare support film, which is the cause of systematic shading variation from darker foreground to lighter background.

Fourth Example Application

Figure 11A:
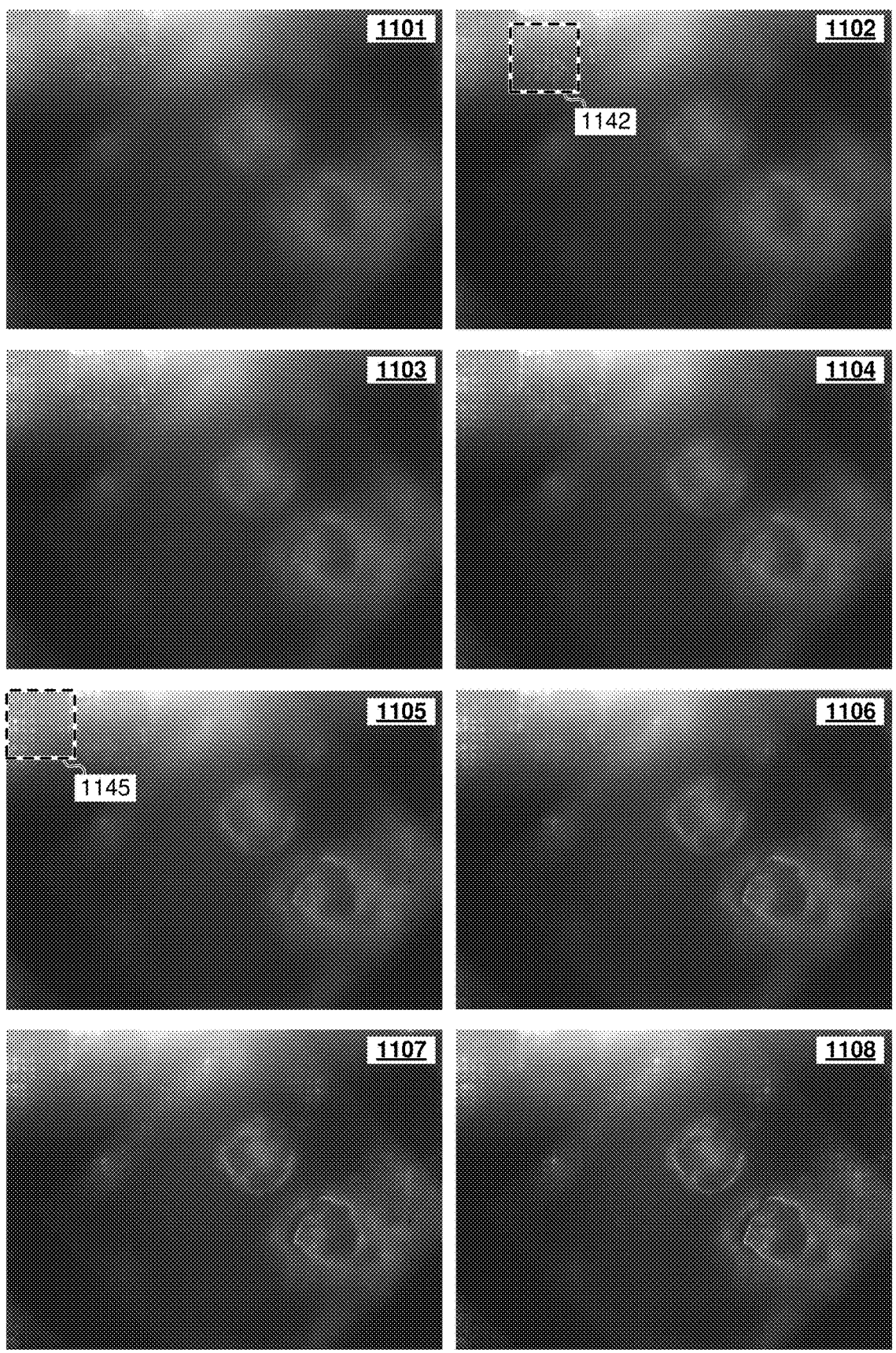
FIGS. 11A-11C together provide a set of images illustrating a fourth example application of the disclosed technologies.
Figure 11B:
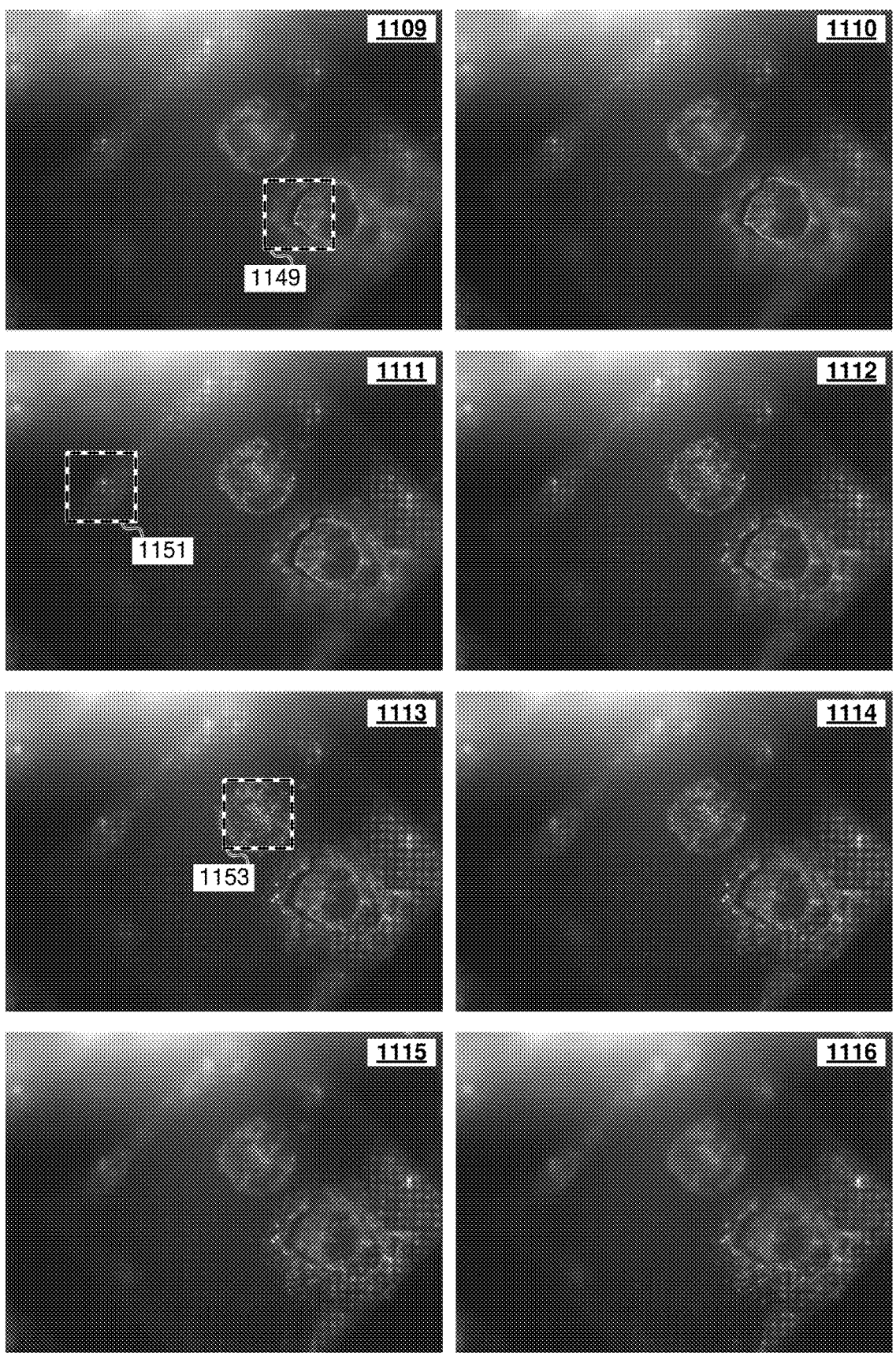
Figure 11C:
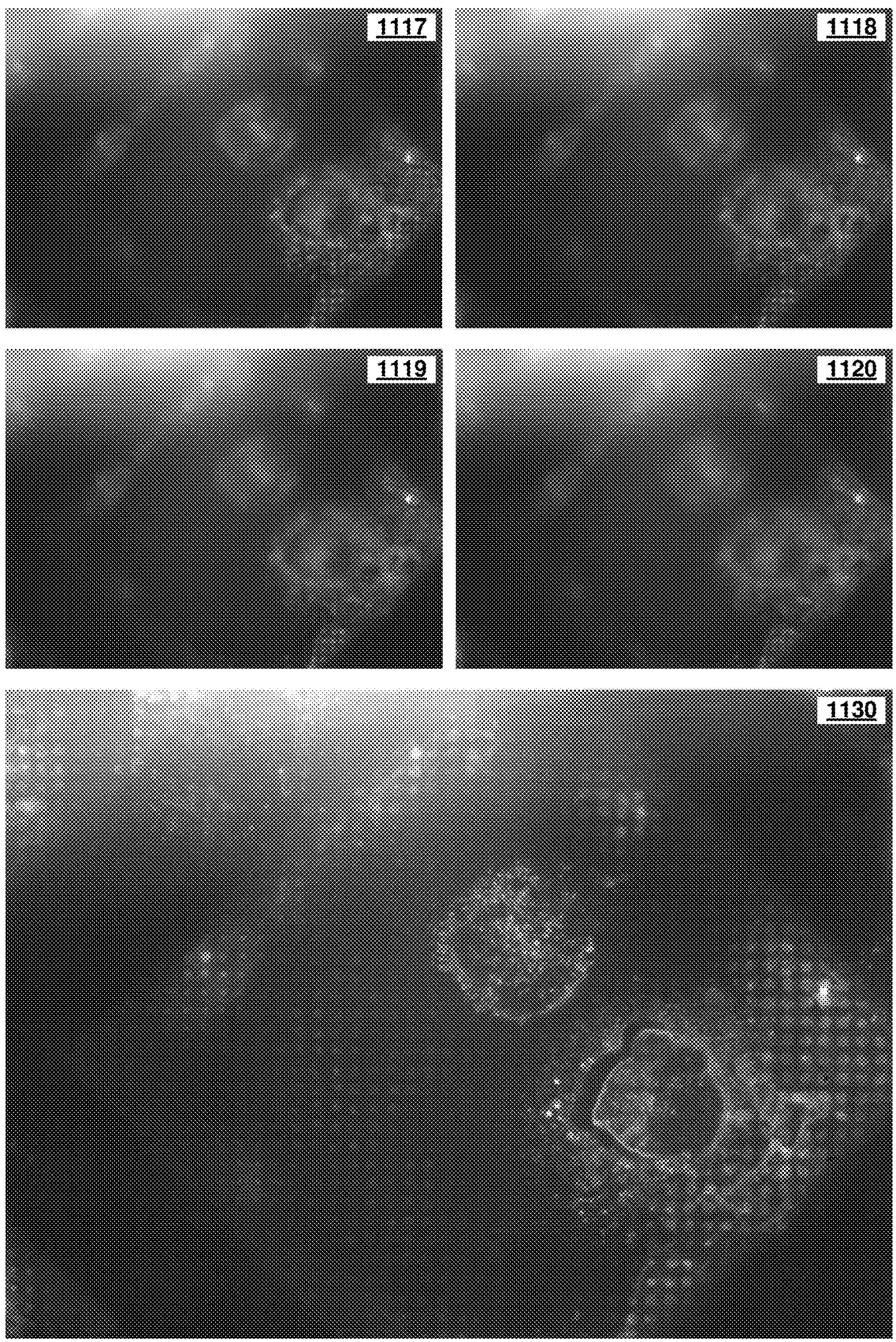

FIGS. 11A-11C together provide a set of images 1101-1120 and 1130 illustrating focus stacking applied to fluorescence imaging, which can be performed in a configuration as discussed in context of beam 150 of FIG. 1 or elsewhere herein. Images 1101-1120 are a set of fluorescence images for respective working depths and in which respective zones are in focus. As a visual aid, exemplary zones 1142, 1145, 1149, 1151, and 1153 are shown in focus on respective images among the set of images 1101-1120. These features can be seen to be out of focus in other images a few slices away from the marked image. To illustrate, zone 1142 is out of focus in image 1105, and zone 1153 is out of focus in image 1115.

Application of focus stacking to images 1101-1120 can generate composite image 1130, in which all zones can be seen in focus.

Additional Examples

The following numbered paragraphs describe additional examples of the disclosed technologies.

Example 1 is an apparatus, including: a tool configured to perform a localized operation on a sample using a first beam; an imager configured to acquire a plurality of images of the sample using a second beam; and a controller configured to: focus stack the plurality of images to obtain a composite image; receive an indication of a location selected in the composite image; and cause the tool to perform the localized operation based on the selected location.

Example 2 includes the subject matter of Example 1, and further specifies that the controller is further configured to: generate a depth map from the plurality of images; use the depth map to determine a working depth from the selected location; and set the tool according to the working depth, for the localized operation.

Example 3 includes the subject matter of any of Examples 1-2, wherein the controller is further configured to form a lamella incorporating the selected location, based at least in part on the localized operation.

Example 4 includes the subject matter of any of Examples 1-3, wherein the tool comprises one or more of: a mill, an etcher, an electron microscope, an electron spectrometer, an ion microscope, an optical microscope, or an optical spectrometer.

Example 5 includes the subject matter of any of Examples 1-4, wherein the localized operation comprises one or more of: milling, etching, microscopy, or spectroscopy.

Example 6 includes the subject matter of any of Examples 1-5, wherein the first beam comprises one or more of: an ion beam, a plasma focused ion beam, an electron beam, or an optical beam.

Example 7 includes the subject matter of any of Examples 1-6, wherein the first beam is directed onto the sample along a beam axis oriented between 60°-87° from a surface normal of the sample.

Example 8 includes the subject matter of any of Examples 1-7, wherein the imager comprises one or more of: an ion microscope, an electron microscope, an optical microscope, a secondary electron detector, a secondary ion detector, or a photodetector.

Example 9 includes the subject matter of any of Examples 1-8, wherein the second beam is directed onto the sample along a viewing axis oriented between 60°-87° from a surface normal of the sample.

Example 10 includes the subject matter of any of Examples 1-9, wherein the second beam comprises one or more of: an ion beam, a plasma focused ion beam, an electron beam, or an optical beam.

Example 11 includes the subject matter of any of Examples 1-10, wherein the first beam and the second beam are produced: in a common beam column; or in distinct beam columns.

Example 12 includes the subject matter of any of Examples 1-11, wherein the focus stacking is performed using one or more of: a multi-scale transform, an image pyramid, a Gaussian image pyramid, a Laplacian image pyramid, or a wavelet transform.

Example 13 includes the subject matter of any of Examples 1-12, wherein the location is selected by: a user, or automated software.

Example 14 includes the subject matter of any of Examples 1-13, wherein the location corresponds to a feature in the sample.

Example 15 includes the subject matter of any of Examples 1-14, wherein the localized operation is performed: at the selected location, at a predetermined transverse offset from the selected location, at a predetermined depth offset from the selected location, over a region including the selected location, or over a region having a transverse offset or depth offset from the selected location.

Example 16 includes the subject matter of any of Examples 2-15, and further specifies that the working depth is equal to or is a predetermined linear transformation of: a first value stored in the depth map for the selected location; a first average of values stored in the depth map in a first zone including the selected location; a second value stored in the depth map at a predetermined transverse offset from the selected location; or a second average of values stored in the depth map in a second zone having a transverse offset from the selected location.

Example 17 is a computer-implemented method comprising: acquiring a plurality of images of a sample at respective focus depths; and focus stacking the plurality of images to obtain a composite image; receiving an indication of a location selected in the composite image; and causing a localized operation to be performed on the sample based on the selected location.

Example 18 includes the subject matter of Example 17, and further specifies that the focus stacking further produces a depth map of the sample, and the method further comprises: using the depth map, determining a working depth from the selected location; setting a tool according to the working depth; and causing the tool to perform the localized operation.

Example 19 includes the subject matter of any of Examples 17-18, and further includes forming a lamella incorporating the selected location, wherein the forming comprises the causing the localized operation to be performed.

Example 20 includes the subject matter of any of Examples 17-19, and further specifies that the images are acquired using one or more of: an ion microscope, an electron microscope, an optical microscope, a secondary electron detector, a secondary ion detector, or a photodetector.

Example 21 includes the subject matter of any of Examples 17-20, and further specifies that the imaging is performed by directing a first beam toward the sample, the first beam comprising: an ion beam, a plasma focused ion beam, an electron beam, or an optical beam.

Example 22 includes the subject matter of any of Examples 21, and further specifies that the first beam is directed toward the sample along a beam axis oriented between 60°-87° from a surface normal of the sample.

Example 23 includes the subject matter of any of Examples 17-22, and further specifies that the sample comprises: a cryogenic sample, a plunge-frozen sample, a biological sample, a semiconductor sample, or a nanostructure.

Example 24 includes the subject matter of any of Examples 17-23, and further specifies that the sample has a surface height variation in a range 1-2, 2-5, 5-10, or 10-20 µm over a surface transverse extent of 2, 5, 10, 20, 50, or 100 µm.

Example 25 includes the subject matter of any of Examples 17-24, and further specifies that the focus stacking is performed using one or more of: a multi-scale transform, an image pyramid, a Gaussian image pyramid, a Laplacian image pyramid, or a wavelet transform.

Example 26 includes the subject matter of any of Examples 17-25, and further specifies that the location is selected by: a user, or an automated program.

Example 27 includes the subject matter of any of Examples 17-26, and further specifies that the location corresponds to a feature in the sample.

Example 28 includes the subject matter of any of Examples 17-27, and further specifies that the localized operation is performed by one or more of: milling, etching, microscopy, or spectroscopy.

Example 29 includes the subject matter of any of Examples 17-28, and further specifies that the localized operation is performed by directing a second beam onto the sample, the second beam comprising: an ion beam, a plasma focused ion beam, an electron beam, or an optical beam.

Example 30 includes the subject matter of any of Examples 29, and further specifies that the second beam is directed onto the sample along a second axis oriented between 60°-87° from a surface normal of the sample.

Example 31 includes the subject matter of any of Examples 17-30, and further specifies that the localized operation is performed: at the selected location, at a predetermined transverse offset from the selected location, at a predetermined depth offset from the selected location, over a region including the selected location, or over a region having a transverse offset or depth offset from the selected location.

Example 32 includes the subject matter of any of Examples 18-31, and further specifies that the working depth is equal to or is a predetermined linear transformation of: a first value stored in the depth map for the selected location; a first average of values stored in the depth map in a first zone including the selected location; a second value stored in the depth map at a predetermined transverse offset from the selected location; or a second average of values stored in the depth map in a second zone having a transverse offset from the selected location.

Example 33 includes the subject matter of any of Examples 18-32, and further specifies that the tool comprises one or more of: a mill, an etcher, an electron microscope, an electron spectrometer, an ion microscope, an optical microscope, or an optical spectrometer.

Example 34 is one or more computer-readable media storing instructions which, when executed by one or more hardware processors, cause the one or more hardware processors to perform the method of any one of Examples 17-33.

A Generalized Computer Environment

Figure 12:
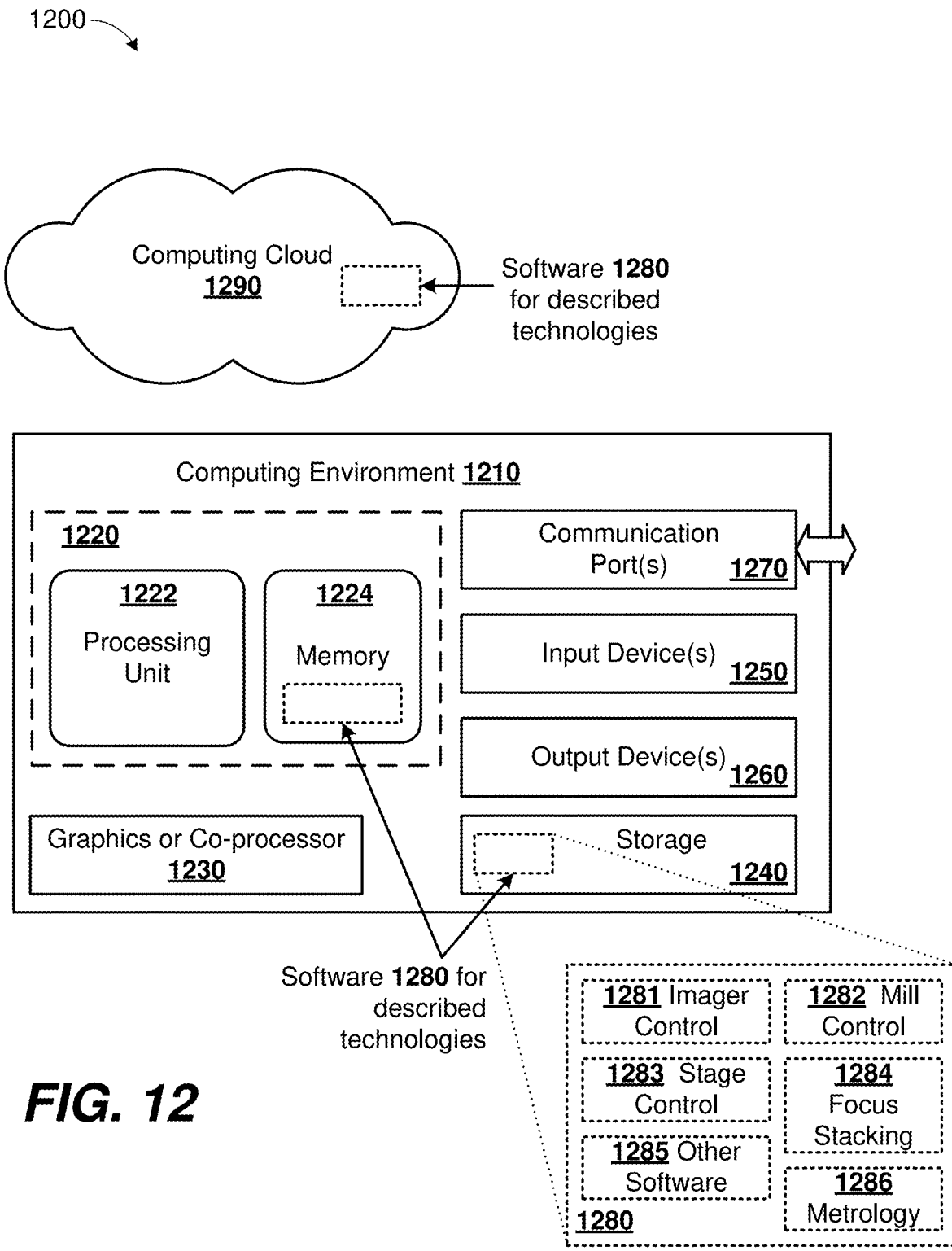
FIG. 12 illustrates a generalized example of a suitable computing environment in which described embodiments, techniques, and technologies pertaining to imaging or milling can be implemented.

FIG. 12 illustrates a generalized example of a suitable computing system 1200 in which described examples, techniques, and technologies can be implemented for applying focus stacking to sample preparation or analysis procedures. The computing system 1200 is not intended to suggest any limitation as to scope of use or functionality of the present disclosure, as the innovations can be implemented in diverse general-purpose or special-purpose computing systems. The computing system 1200 can control a FIB imaging tool, a FIB milling tool, a SEM, a stage, an analytic instrument, or other similar equipment; can perform focus stacking, metrology, or other analysis on images or other acquired data representative of a sample; can control a stage, ion beam column, or electron beam column; or can acquire, process, output, or store measurement data.

With reference to FIG. 12, the computing environment 1210 includes one or more processing units 1222 and memory 1224. In FIG. 12, this basic configuration 1220 is included within a dashed line. Processing unit 1222 can execute computer-executable instructions, such as for control, metrology, or other functions as described herein. Processing unit 1222 can be a general-purpose central processing unit (CPU), a processor in an application-specific integrated circuit (ASIC), or any other type of processor. In a multi-processing system, multiple processing units execute computer-executable instructions to increase processing power. Computing environment 1210 can also include a graphics processing unit or co-processing unit 1230. Tangible memory 1224 can be volatile memory (e.g., registers, cache, or RAM), non-volatile memory (e.g., ROM, EEPROM, or flash memory), or some combination thereof, accessible by processing units 1222, 1230. The memory 1224 stores software 1280 implementing one or more innovations described herein, in the form of computer-executable instructions suitable for execution by the processing unit(s) 1222, 1230. For example, software 1280 can include software 1281 for controlling a FIB, a SEM, or other imaging tool, software 1282 for controlling a FIB or other milling tool, software 1283 for controlling a stage on which a sample is supported, software 1284 for focus stacking, software 1286 for performing metrology or other analysis on sample data, or other software 1285 (including user interface, host interface, or fault detection). The inset shown for software 1280 in storage 1240 can be similarly applicable to software 1280 elsewhere in FIG. 12. The memory 1224 can also store control parameters, calibration data, measurement data, other database data, configuration data, or operational data.

A computing system 1210 can have additional features, such as one or more of storage 1240, input devices 1250, output devices 1260, or communication ports 1270. An interconnection mechanism (not shown) such as a bus, controller, or network interconnects the components of the computing environment 1210. Typically, operating system software (not shown) provides an operating environment for other software 1280 executing in the computing environment 1210, and coordinates activities of the components of the computing environment 1210.

The tangible storage 1240 can be removable or non-removable, and includes magnetic disks, magnetic tapes or cassettes, CD-ROMs, DVDs, or any other medium which can be used to store information in a non-transitory way and which can be accessed within the computing environment 1210. The storage 1240 stores instructions of the software 1280 (including instructions and/or data) implementing one or more innovations described herein. Storage 1240 can also store image data, measurement data, workflow programs, reference data, calibration data, configuration data, sample data, or other databases or data structures described herein.

The input device(s) 1250 can be a mechanical, touch-sensing, or proximity-sensing input device such as a keyboard, mouse, pen, touchscreen, or trackball, a voice input device, a scanning device, or another device that provides input to the computing environment 1210. The output device(s) 1260 can be a display, printer, speaker, optical disk writer, or another device that provides output from the computing environment 1210. Input or output can also be communicated to/from a remote device (e.g. as described in context of FIG. 1) over a network connection, via communication port(s) 1270.

The communication port(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

A data acquisition system can be integrated into computing environment 1210, either as an input device 1250 or coupled to a communication port 1270, and can include analog-to-digital converters or connections to an instrumentation bus. An instrumentation control system can be integrated into computing environment 1210, either as an output device 1260 or coupled to a communication port 1270, and can include digital-to-analog converters, switches, or connections to an instrumentation bus.

In some examples, computer system 1200 can also include a computing cloud 1290 in which instructions implementing all or a portion of the disclosed technology are executed. Any combination of memory 1224, storage 1240, and computing cloud 1290 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computing system," "computing environment." and "computing device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Furthermore, as used herein, the terms "or" and "and/or" mean any one item or combination of items in the phrase.

The systems, methods, and apparatus described herein should not be construed as limiting in any way. Instead, the present disclosure is directed toward all novel and nonobvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. The technologies from any example can be combined with the technologies described in any one or more of the other examples.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "acquire," "apply." "average." "configure," "control," "correlate," "decimate," "decompose," "determine," "direct." "downsample," "filter," "fuse," "generate," "image," "produce," "retrieve," "scale," "select," "set," "store," "transform," or "upsample" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "maximum," "optimum," "extremum," or the like. It will be appreciated that such descriptions are intended to indicate that a selection among a few or among many alternatives can be made, and such selections need not be lower, better, less, or otherwise preferable to other alternatives not considered.

Theories of operation, scientific principles, or other theoretical descriptions presented herein in reference to the apparatus or methods of this disclosure have been provided to facilitate explanation for the purposes of better understanding and are not intended to be limiting in scope. That is, the disclosed systems, methods, and apparatus are not limited to such theories of operation. The appended claims are not limited to embodiments that function in the manner described by such theories of operation.

Any of the disclosed methods can be controlled by, or implemented as, computer-executable instructions or a computer program product stored on one or more computer-readable storage media, such as tangible, non-transitory computer-readable storage media, and executed on a computing device (e.g., any available computing device, including tablets, smart phones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1224, and storage 1240. The terms computer-readable media or computer-readable storage media do not include signals and carrier waves. In addition, the terms computer-readable media or computer-readable storage media do not include communication ports (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in Adobe Flash, C, C++, C #, Curl, Dart, Fortran, Java, JavaScript, Julia, Lisp, Matlab, Octave, Perl, Python, Qt. R, Ruby, SAS, SPSS, SQL, WebAssembly, any derivatives thereof, or any other suitable programming language, or, in some examples, markup languages such as HTML or XML, or with any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, side-loaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

In view of the many possible embodiments to which the principles of the disclosed subject matter may be applied, it should be recognized that the illustrated embodiments are only preferred examples and should not be taken as limiting the scope of the claims. Rather, the scope of the claimed subject matter is defined by the following claims. We therefore claim all that comes within the scope and spirit of these claims.

We claim:

1. An apparatus comprising:
   a tool configured to perform a localized operation on a sample using a first beam;
   an imager configured to acquire a plurality of images of the sample using a second beam; and
   a controller configured to:
      focus stack the plurality of images to obtain a composite image;
      responsive to a particular location being selected in the composite image, receive an indication of the particular location; and
      responsive to the received indication of the particular location, cause the tool to perform the localized operation based on the particular location.

2. The apparatus of claim 1, wherein the controller is further configured to:
   generate a depth map from the plurality of images;
   use the depth map to determine a working depth from the selected location; and
   set the tool according to the working depth, for the localized operation.

3. The apparatus of claim 1, wherein the first beam comprises a plasma focused ion beam.

4. The apparatus of claim 1, wherein the first beam is directed onto the sample along a beam axis oriented between 60°-87° from a surface normal of the sample.

5. The apparatus of claim 1, wherein the imager comprises an ion microscope.

6. The apparatus of claim 1, wherein the second beam is directed onto the sample along a viewing axis oriented between 60°-87° from a surface normal of the sample.

7. The apparatus of claim 1, wherein the second beam comprises a plasma focused ion beam.

8. The apparatus of claim 1, wherein the second beam comprises an optical beam.

9. The apparatus of claim 1, wherein the first beam and the second beam are produced in a common beam column.

10. The apparatus of claim 1, wherein the controller is configured to perform the focus stacking by applying a multi-scale transform to each of the plurality of images.

11. The apparatus of claim 1, wherein the composite image is a two-dimensional composite image of a surface of the sample.

12. A computer-implemented method comprising:
   acquiring a plurality of images of a sample at respective focus depths; and
   focus stacking the plurality of images to obtain a composite image;
   responsive to a particular location being selected in the composite image, receiving an indication of the particular location; and
   responsive to the received indication of the particular location, causing a localized operation to be performed on the sample based on the particular location.

13. The computer-implemented method of claim 12, wherein the focus stacking further produces a depth map of the sample, and the method further comprises:
   using the depth map, determining a working depth from the selected location;
   setting a tool according to the working depth; and
   causing the tool to perform the localized operation.

14. The computer-implemented method of claim 13, wherein the working depth is based on a value stored in the depth map at a predetermined transverse offset from the selected location.

15. The computer-implemented method of claim 12, further comprising forming a lamella incorporating the selected location, wherein the forming comprises the causing the localized operation to be performed.

16. The computer-implemented method of claim 12, wherein the sample comprises a cryogenic biological sample.

17. The computer-implemented method of claim 12, wherein the sample has a surface height variation in a range 2-10 µm over a surface transverse extent in a range 5-20 µm.

18. The computer-implemented method of claim 12, wherein the location is selected by an automated program.

19. The computer-implemented method of claim 12, wherein the localized operation is performed by milling.

20. The computer-implemented method of claim 12, wherein the localized operation is performed at a predetermined transverse and/or depth offset from the selected location.

21. One or more non-transitory computer-readable media storing instructions which, when executed by one or more hardware processors, actuate the one or more hardware processors to perform operations comprising:
   acquiring a plurality of images of a sample at respective focus depths; and
   focus stacking the plurality of images to obtain a composite image;
   responsive to a particular location being selected in the composite image, receiving an indication of the particular location; and
   responsive to the received indication of the particular location, causing a localized operation to be performed on the sample based on the particular location.

* * * * *